United States Patent
Yao et al.

(10) Patent No.: US 11,665,587 B2
(45) Date of Patent: May 30, 2023

(54) DATA PROCESSING METHOD AND DEVICE TO RESOLVE PACKET LOSS IN MULTI-HOP LINK SYSTEM

(71) Applicant: Huawei Technologies Co., Ltd., Shenzhen (CN)

(72) Inventors: Chuting Yao, Beijing (CN); Haibo Xu, Beijing (CN); Yuanping Zhu, Shanghai (CN); Yalin Liu, Munich (DE); Jian Wang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 134 days.

(21) Appl. No.: 17/054,251

(22) PCT Filed: May 7, 2019

(86) PCT No.: PCT/CN2019/085868
§ 371 (c)(1),
(2) Date: Nov. 10, 2020

(87) PCT Pub. No.: WO2019/214619
PCT Pub. Date: Nov. 14, 2019

(65) Prior Publication Data
US 2021/0368389 A1    Nov. 25, 2021

(30) Foreign Application Priority Data

May 10, 2018    (CN) .......................... 201810444917.9

(51) Int. Cl.
*H04W 28/06*    (2009.01)
*H04L 1/16*    (2023.01)
(Continued)

(52) U.S. Cl.
CPC ........... *H04W 28/06* (2013.01); *H04L 1/1642* (2013.01); *H04W 80/02* (2013.01)

(58) Field of Classification Search
None
See application file for complete search history.

(56) References Cited

U.S. PATENT DOCUMENTS

2016/0066308 A1    3/2016   Shi
2017/0041767 A1*   2/2017   Vajapeyam ........... H04W 72/04
(Continued)

FOREIGN PATENT DOCUMENTS

CN    101478380 A    7/2009
CN    101547070 A    9/2009
(Continued)

OTHER PUBLICATIONS

AT&T, "Protocol stack design considerations for L2 relaying," R2-1805958, 3GPP TSG-RAN WG2 #101 bis, Sanya, China, XP051429569, Apr. 16-20, 2018, 4 pages.
(Continued)

*Primary Examiner* — Diane L Lo
(74) *Attorney, Agent, or Firm* — Conley Rose, P.C.

(57) ABSTRACT

A data processing method, where a first device communicates with a second device using a relay node, where the relay node does not have a Packet Data Convergence Protocol (PDCP) entity, and the method includes transmitting, by the first device, a first data unit group, where the first data unit group is in a first sequence range, receiving, by the first device, first information using the relay node, where the first information indicates a data unit that the second device has received or has not received in the first data unit group, determining, by the first device, a second sequence range based on the first information.

20 Claims, 15 Drawing Sheets

(51) Int. Cl.
    *H04W 80/02*     (2009.01)
    *H04L 1/1607*    (2023.01)

(56)        References Cited

U.S. PATENT DOCUMENTS

2017/0289845 A1*  10/2017  Chiu ................. H04W 72/1231
2018/0324882 A1*  11/2018  Gulati .................. H04W 72/14
2019/0132238 A1*   5/2019  Tang ..................... H04L 1/1635
2019/0239114 A1*   8/2019  Martin ............. H04W 28/0278
2019/0261450 A1*   8/2019  Adachi ................ H04W 88/04
2020/0029391 A1*   1/2020  Xu ......................... H04W 4/70
2020/0112870 A1*   4/2020  Wang ............... H04W 28/0263

FOREIGN PATENT DOCUMENTS

CN      101765221 A      6/2010
CN      102449944 B     11/2015
CN      105245317 A      1/2016
CN      107113689 A      8/2017
EP        2469750 A1     6/2012
JP     2007053588 A      3/2007
WO     2018059983 A1     4/2018

OTHER PUBLICATIONS

3Gpp, TS 38.323 V15.1.0, "3rd Generation Partnership Project; Technical Specification Group Radio Access Network; NR; Packet Data Convergence Protocol (PDCP) specification (Release 15)," XP051450734, Mar. 2018, 25 pages.

* cited by examiner

| Hyper frame number (HFN) | PDCP sequence number (PDCP SN) |

DATA PROCESSING METHOD AND DEVICE TO RESOLVE PACKET LOSS IN MULTI-HOP LINK SYSTEM

CROSS-REFERENCE TO RELATED APPLICATIONS

This application is a U.S. National Stage of International Patent Application No. PCT/CN2019/085868 filed on May 7, 2019, which claims priority to Chinese Patent Application No. 201810444917.9 filed on May 10, 2018. Both of the aforementioned applications are hereby incorporated by reference in their entireties.

TECHNICAL FIELD

This application relates to the communications field, and more specifically, to a data processing method and a device.

BACKGROUND

To ensure deployment and application of a future cellular network, a technology supporting a wireless backhaul and relay link is provided in a 5th generation (5 Generation, 5G) new radio (New Radio, NR) technology. As an integrated access and backhaul (Integrated Access and Backhaul, IAB) technology, this technology can provide denser and more flexible deployment of NR cells, without a massive increase of transport networks. In an IAB network structure, a donor base station (Donor 5G NodeB, DgNB) may be directly connected to a core network, and may be connected to a plurality of relay nodes (Relay Node, RN), and the relay nodes may be connected to other relay nodes. Links between base stations (including a link between the donor base station and a relay node and a link between relay nodes) are referred to as backhaul (Backhaul) links. Links between user equipment and base stations (including a link between the donor base station and the user equipment and a link between a relay node and the user equipment) are referred to as access (Access) links. The user equipment (User Equipment, UE) may be connected to the donor base station or a relay node. A direct connection between the user equipment and the donor base station is a one-hop link. The user equipment may be further connected to the donor base station by using one or more relay nodes. In this case, the connection is a multi-hop link.

In a long term evolution (Long Term Evolution, LTE) system, user equipment may be directly connected to a base station, or user equipment may be connected to a base station by using a relay node. In the long term evolution (Long Term Evolution, LTE) system, the relay node is a layer 3 relay node in a protocol stack, and its radio link control (Radio Link Control, RLC) is responsible for reordering received data packets that are disordered, and delivering the data packets to a packet data convergence protocol (Packet Data Convergence Protocol, PDCP) layer above the RLC layer. In NR in a 5G system, a relay node is a layer 2 relay node in a protocol stack, and its RLC layer has no reordering function. Therefore, when data processing is performed by user equipment and a donor base station on a multi-hop link in the 5G system, a packet loss problem is caused. This severely affects accuracy of data transmission, and reduces communication efficiency, resulting in poor user experience.

SUMMARY

This application provides a data processing method and a device to resolve a packet loss problem generated when data processing is performed by user equipment and a donor base station in a multi-hop link in a 5G system, improve accuracy of data transmission and efficiency of data transmission, and improve user experience.

According to a first aspect, a data processing method is provided. In the method, a first device communicates with a second device by using at least one relay node, and the at least one relay node does not have a packet data convergence protocol PDCP entity. The method includes:

the first device transmits a first data unit group, where the first data unit group is in a first sequence range;

the first device receives first information by using the at least one relay node, where the first information is used to indicate a data unit that the second device has received and/or has not received in the first data unit group; and the first device determines a second sequence range based on the first information.

In the technical solution of this embodiment of this application, the first device may transmit data units in the first sequence range, and the first device determines the second sequence range based on the first information about the data unit that the second device has received and/or has not received in the first data unit group, thereby avoiding a packet loss problem generated because a data unit is beyond a receive window of a receive end, and improving accuracy of data transmission and efficiency of data transmission.

It should be understood that in an uplink transmission scenario, the first device may be a terminal device, and the second device may be a base station. The terminal device transmits a first data unit group, where the first data unit group is in a first sequence range; the terminal device receives first information by using the at least one relay node, where the first information is used to indicate a data unit that the donor base station has received and/or has not received in the first data unit group; and the terminal device determines a second sequence range based on the first information.

In a downlink transmission scenario, the first device may be a donor base station, and the second device may be a terminal device. The donor base station transmits a first data unit group, where the first data unit group is in a first sequence range; the donor base station receives first information by using the at least one relay node, where the first information is used to indicate a data unit that the terminal device has received and/or has not received in the first data unit group; and the donor base station determines a second sequence range based on the first information.

With reference to the first aspect, in a first possible implementation of the first aspect, that the first device determines a second sequence range based on the first information includes:

if the first information includes information about successful reception of N consecutive data units starting from the first data unit in the first sequence range, the first device obtains the second sequence range by shifting the first sequence range by N sequences, where N is a positive integer.

With reference to the first aspect or the first possible implementation of the first aspect, in a second possible implementation, that the first device receives first information by using the at least one relay node includes:

the first device receives a first message transmitted by the second device and forwarded by the at least one relay node, where the first message includes the first information.

With reference to the second possible implementation of the first aspect, in a third possible implementation, the first message is a status report of a PDCP entity; or the first message is a status report of a radio link control RLC entity.

With reference to the first aspect or the first possible implementation of the first aspect, in a fourth possible implementation, that the first device receives first information by using the at least one relay node includes:

the first device receives a second message obtained by the at least one relay node based on a first message transmitted by the second device, where the second message includes the first information.

With reference to the fourth possible implementation of the first aspect, in a fifth possible implementation, the second message is determined by the at least one relay node based on the first message and a mapping relationship between numbers of data units transmitted and received that is maintained by the at least one relay node.

With reference to the fifth possible implementation of the first aspect, in a sixth possible implementation, the second message is a status report of an RLC entity.

With reference to the second or the third possible implementation of the first aspect, in a seventh possible implementation, the first message is a periodically transmitted message.

In the technical solution of this embodiment of this application, the first message is periodically transmitted to ensure stability of a communications system.

With reference to the second possible implementation of the first aspect, in an eighth possible implementation, before the first device receives the first message from the second device and forwarded by the at least one relay node, the method further includes:

the first device transmits a query request to the second device.

According to a second aspect, a data processing method is provided. In the method, a first device communicates with a second device by using at least one relay node, and the at least one relay node does not have a packet data convergence protocol PDCP entity. The method includes:

a first relay node receives first information transmitted by a previous-hop relay node of the first relay node or the second device, where the first information is used to indicate a data unit that the second device has received and/or has not received in a first data unit group, and the first data unit group is in a first sequence range; and the first relay node forwards the first information.

In the technical solution of this embodiment of this application, the first device may transmit data units in the first sequence range, and the first device determines a second sequence range based on the first information about the data unit that the second device has received and/or has not received in the first data unit group, where the first information transmitted by the second device is forwarded by the first relay node to the first device, thereby avoiding a packet loss problem generated because a data unit is beyond a receive window of a receive end, and improving accuracy of data transmission and efficiency of data transmission.

According to a third aspect, a data processing method is provided. In the method, a first device communicates with a second device by using at least one relay node, and the at least one relay node does not have a packet data convergence protocol PDCP entity. The method includes:

a first relay node receives first information transmitted by the second device, where the first information is used to indicate a data unit that the second device has received and/or has not received in a first data unit group, and the first data unit group is in a first sequence range; and the first relay node transmits second information, where the second information is determined based on a mapping relationship between numbers of data units transmitted and received that is maintained by the first relay node and the first information.

In the technical solution of this embodiment of this application, the first device may transmit data units in the first sequence range, and the first device determines a second sequence range based on the first information about the data unit that the second device has received and/or has not received in the first data unit group, where the first relay node obtains the second information by processing the first information transmitted by the second device, thereby avoiding a packet loss problem generated because a data unit is beyond a receive window of a receive end, and improving accuracy of data transmission and efficiency of data transmission.

According to a fourth aspect, a data processing method is provided. In the method, a first device communicates with a second device by using at least one relay node, and the at least one relay node does not have a packet data convergence protocol PDCP entity. The method includes:

a first relay node receives a first data unit group transmitted by the first device, and the first relay node adds numbers to data units in the first data unit group.

In the technical solution of this embodiment of this application, the first relay node can add numbers to data units, thereby avoiding a packet loss problem generated because a data unit is beyond a receive window of a receive end, and improving accuracy of data transmission and efficiency of data transmission.

It should be understood that the first relay node may be a relay node that directly communicates with the first device.

With reference to the fourth aspect, in a first possible implementation of the fourth aspect, that the first relay node adds numbers to data units in the first data unit group includes:

the first relay node adds the numbers to the data units in the first data unit group based on receiving order.

With reference to the fourth aspect or the first possible implementation of the fourth aspect, in a second possible implementation, before the first relay node adds numbers to data units in the first data unit group, the method further includes:

the first relay node orders the data units in the first data unit group.

With reference to the fourth aspect, or the first or the second possible implementation of the fourth aspect, in a third possible implementation, an adaptation layer of the first relay node has an ordering function; or a radio link control RLC entity of the first relay node has an ordering function; and/or the adaptation layer of the first relay node has a numbering function.

For example, the adaptation layer of the first relay node has the numbering function or the ordering function.

For example, the adaptation layer of the first relay node has the numbering function and the ordering function.

For example, the radio link control RLC entity of the first relay node has the ordering function, and the adaptation layer of the first relay node has the numbering function.

For example, the radio link control RLC entity of the first relay node has the ordering function, or the adaptation layer of the first relay node has the numbering function.

With reference to the third possible implementation of the fourth aspect, in a fourth possible implementation, the adaptation layer is located above the radio link control RLC entity.

With reference to the third possible implementation of the fourth aspect, in a fifth possible implementation, the adaptation layer is located above a media access control MAC entity.

According to a fifth aspect, a data processing method is provided. In the method, a first device communicates with a second device by using at least one relay node, and the at least one relay node does not have a packet data convergence protocol PDCP entity. The method includes:

a second relay node receives a data unit transmitted by a relay node that is connected to the second relay node, where the data unit has a number; and the second relay node orders the data unit having the number.

In the technical solution of this embodiment of this application, the second relay node can order data units that have numbers, thereby avoiding a packet loss problem generated because a data unit is beyond a receive window of a receive end, and improving accuracy of data transmission and efficiency of data transmission.

It should be understood that the second relay node may be an intermediate relay node, that is, a relay node that does not directly communicate with the first device or the second device.

With reference to the fifth aspect, in a first possible implementation of the fifth aspect, the number is added by a first relay node, and the first relay node is a relay node that directly communicates with the terminal device; or the number is added by a relay node that directly communicates with the second relay node.

With reference to the fifth aspect or the first possible implementation of the fifth aspect, in a second possible implementation, an adaptation layer of the second relay node has an ordering function; or a radio link control RLC entity of the second relay node has an ordering function.

With reference to the second possible implementation of the fifth aspect, in a third possible implementation, the adaptation layer is located above the radio link control RLC entity.

With reference to the second possible implementation of the fifth aspect, in a fourth possible implementation, the adaptation layer is located above a media access control MAC entity.

According to a sixth aspect, a data processing method is provided. In the method, a first device communicates with a second device by using at least one relay node, and the at least one relay node does not have a packet data convergence protocol PDCP entity. The method includes:

a first relay node receives a data unit having a number and transmitted by the at least one relay node;

the first relay node orders the data unit based on the number; and the first relay node transmits a first data unit group to the first device in order based on the number, where the first data unit group includes the ordered data unit.

In the technical solution of this embodiment of this application, the first relay node can add numbers to data units or order data units, thereby avoiding a packet loss problem generated because a data unit is beyond a receive window of a receive end, and improving accuracy of data transmission and efficiency of data transmission.

With reference to the sixth aspect, in a first possible implementation of the sixth aspect, the number is added by an adaptation layer of the second device.

With reference to the sixth aspect, in a second possible implementation of the sixth aspect, an adaptation layer of the first relay node has an ordering function; or a radio link control RLC entity of the first relay node has an ordering function.

With reference to the second possible implementation of the sixth aspect, in a third possible implementation, the adaptation layer is located above the radio link control RLC entity.

With reference to the second possible implementation of the sixth aspect, in a fourth possible implementation, the adaptation layer is located above a media access control MAC entity.

According to a seventh aspect, a data processing method is provided. In the method, a first device communicates with a second device by using at least one relay node, and the at least one relay node does not have a packet data convergence protocol PDCP entity. The method includes:

a second relay node receives a data unit transmitted by a relay node that is connected to the second relay node, where the data unit has a number; and the second relay node orders the data unit having the number.

In the technical solution of this embodiment of this application, the second relay node can order data units that have numbers, thereby avoiding a packet loss problem generated because a data unit is beyond a receive window of a receive end, and improving accuracy of data transmission and efficiency of data transmission.

With reference to the seventh aspect, in a first possible implementation of the seventh aspect, the number is added by an adaptation layer of the second device; or the number is added by a relay node that directly communicates with the second relay node.

With reference to the first possible implementation of the seventh aspect, in a second possible implementation, an adaptation layer of the second relay node has an ordering function; or a radio link control RLC entity of the second relay node has an ordering function.

With reference to the second possible implementation of the seventh aspect, in a third possible implementation, the adaptation layer is located above the radio link control RLC entity.

With reference to the second possible implementation of the seventh aspect, in a fourth possible implementation, the adaptation layer is located above a media access control MAC entity.

According to an eighth aspect, a data processing method is provided. In the method, a first device communicates with a second device by using at least one relay node, and the at least one relay node does not have a packet data convergence protocol PDCP entity. The method includes:

the first device receives a third message, where the third message includes hop count information for communication between the first device and the second device; and the first device determines a first sequence range based on the hop count information, where the first sequence range is used to indicate a range of sequence numbers allocated by the first device.

In the technical solution of this embodiment of this application, a maximum quantity of data units that a transmit end is allowed to transmit is controlled, thereby avoiding a packet loss problem generated because a data unit is beyond a receive window of a receive end, and improving accuracy of data transmission and efficiency of data transmission.

With reference to the eighth aspect, in a first possible implementation of the eighth aspect, the first sequence range is less than or equal to a quantity of allocated sequence numbers, and the quantity of allocated sequence numbers is a sequence number space divided by a hop count and then divided by 2.

With reference to the eighth aspect or the first possible implementation of the eighth aspect, in a second possible implementation, the third message is a broadcast message.

With reference to the eighth aspect or the first possible implementation of the eighth aspect, in a third possible implementation, the third message is a message transmitted by using dedicated signaling.

With reference to the eighth aspect, or the first, the second, or the third possible implementation of the eighth aspect, in a fourth possible implementation, the third message is transmitted by the second device.

With reference to the eighth aspect, or the first, the second, or the third possible implementation of the eighth aspect, in a fifth possible implementation, the third message is transmitted by the at least one relay node.

According to a ninth aspect, a data processing method is provided. In the method, a first device communicates with a second device by using at least one relay node, and the at least one relay node does not have a packet data convergence protocol PDCP entity. The method includes:

a first relay node determines first hop count information, where the first relay node is a relay node that directly communicates with the first device; and the first relay node transmits a third message to the first device, where the third message includes the first hop count information, where the first hop count information is a quantity of the at least one relay node or a quantity of the at least one relay node plus 1.

In the technical solution of this embodiment of this application, a quantity of data units at a transmit end is controlled, thereby avoiding a packet loss problem generated because a data unit is beyond a receive window of a receive end, and improving accuracy of data transmission and efficiency of data transmission.

With reference to the ninth aspect, in a first possible implementation of the ninth aspect, the transmitting a third message to the first device includes:

transmitting the third message to the first device by broadcast.

With reference to the ninth aspect, in a second possible implementation of the ninth aspect, the transmitting a third message to the first device includes:

transmitting the third message to the first device by using dedicated signaling.

With reference to the ninth aspect, in a third possible implementation of the ninth aspect, that the first relay node determines the first hop count information includes:

the first relay node obtains the first hop count information by adding 1 to second hop count information broadcast by a previous-hop relay node of the first relay node.

According to a tenth aspect, a data processing method is provided. In the method, a first device communicates with a second device by using at least one relay node, and the at least one relay node does not have a packet data convergence protocol PDCP entity. The method includes:

the first device receives, by using the at least one relay node, a first data unit transmitted by the second device, where the first data unit carries a count value; and the first device processes the first data unit based on the count value carried in the first data unit.

In the technical solution of this embodiment of this application, a maximum edge of a transmit window exists at a transmit end, a maximum edge of a receive window does not exist at a receive end, and a data unit carrying a count value is transmitted, so that the data unit is processed, thereby avoiding a packet loss problem generated because a data unit is beyond the receive window of the receive end, and improving accuracy of data transmission and efficiency of data transmission.

With reference to the tenth aspect, in a first possible implementation of the tenth aspect, that the first device processes the first data unit based on the count value carried in the first data unit includes:

if the count value of the first data unit is greater than a count value next to a count value of a last data unit currently already delivered, storing the first data unit; or if the count value of the first data unit is equal to a count value next to a count value of a last data unit currently already delivered, delivering the first data unit to an upper layer of a packet data convergence protocol PDCP entity; or if the count value of the first data unit is less than a count value next to a count value of a last data unit currently already delivered, discarding the first data unit.

With reference to the first possible implementation of the tenth aspect, in a second possible implementation, the method further includes:

storing the first data unit, and delivering the first data unit to the upper layer of the PDCP entity in order based on the count value of the first data unit.

With reference to the tenth aspect, or the first or the second possible implementation of the tenth aspect, in a third possible implementation, the first data unit is in the first sequence range.

With reference to the third possible implementation of the tenth aspect, in a fourth possible implementation, the first sequence range indicates a range of count values that the second device is allowed to allocate or a range of count values that the second device is allowed to allocate when transmitting the first data unit.

With reference to the third or the fourth possible implementation of the tenth aspect, in a fifth possible implementation, a size of the first sequence range is half of a sequence number space or less than half of a sequence number space.

According to an eleventh aspect, a data processing method is provided. In the method, a first device communicates with a second device by using at least one relay node, and the at least one relay node does not have a packet data convergence protocol PDCP entity. The method includes:

the second device transmits a first data unit to the first device by using the at least one relay node, where the first data unit carries a count value, where the first data unit belongs to a first sequence range, and the first sequence range is used to indicate a range of count values that the second device is allowed to allocate.

With reference to the eleventh aspect, in a first possible implementation of the eleventh aspect, a size of the first sequence range is half of a sequence number space or less than half of a sequence number space.

According to a twelfth aspect, a communications device is provided. The communications device communicates with a second device by using at least one relay node, and the at least one relay node does not have a packet data convergence protocol PDCP entity. The communications device includes:

a transceiver module, configured to transmit a first data unit group, where the first data unit group is in a first sequence range, where the transceiver module is further configured to receive first information by using the at least one relay node, where the first information is used to indicate a data unit that the second device has received and/or has not received in the first data unit group; and a processing module, configured to determine a second sequence range based on the first information.

With reference to the twelfth aspect, in a first possible implementation of the twelfth aspect, the processing module is further configured to:

if the first information includes information about successful reception of N consecutive data units starting from the first data unit in the first sequence range, obtain the second sequence range by shifting the first sequence range by N sequences, where N is a positive integer.

With reference to the twelfth aspect or the first possible implementation of the twelfth aspect, in a second possible implementation, the transceiver module is further configured to:

receive a first message transmitted by the second device and forwarded by the at least one relay node, where the first message includes the first information.

With reference to the second possible implementation of the twelfth aspect, in a third possible implementation, the first message is a status report of a PDCP entity; or the first message is a status report of a radio link control RLC entity.

With reference to the twelfth aspect or the first possible implementation of the twelfth aspect, in a fourth possible implementation, the transceiver module is further configured to receive a second message obtained by the at least one relay node based on a first message transmitted by the second device, where the second message includes the first information.

With reference to the fourth possible implementation of the twelfth aspect, in a fifth possible implementation, the second message is determined by the at least one relay node based on the first message and a mapping relationship between numbers of data units transmitted and received that is maintained by the at least one relay node.

With reference to the fifth possible implementation of the twelfth aspect, in a sixth possible implementation, the second message is a status report of an RLC entity.

With reference to the second or the third possible implementation of the twelfth aspect, in a seventh possible implementation, the first message is a periodically transmitted message.

With reference to the second possible implementation of the twelfth aspect, in an eighth possible implementation, the communications device further includes:

a querying module, configured to transmit a query request to the second device.

According to a thirteenth aspect, a communications device is provided. A first device communicates with a second device by using at least one communications device, and the at least one communications device does not have a packet data convergence protocol PDCP entity. The communications device includes:

a transceiver module, configured to receive first information transmitted by a previous-hop relay node of the first relay node or the second device, where the first information is used to indicate a data unit that the second device has received and/or has not received in a first data unit group, and the first data unit group is in a first sequence range, where the transceiver module is further configured to forward the first information.

It should be noted that the communications device in this embodiment of this application may correspond to the relay node in the foregoing method, for example, the first relay node.

According to a fourteenth aspect, a communications device is provided. A first device communicates with a second device by using at least one communications device, and the at least one communications device does not have a packet data convergence protocol PDCP entity. The communications device includes:

a transceiver module, configured to receive first information transmitted by the second device, where the first information is used to indicate a data unit that the second device has received and/or has not received in a first data unit group, and the first data unit group is in a first sequence range; and a processing module, configured to generate a second message, where the second information is determined based on a mapping relationship between numbers of data units transmitted and received that is maintained by the communications device and the first information, where the transceiver module is further configured to transmit the second information.

It should be noted that the communications device in this embodiment of this application may correspond to the relay node in the foregoing method, for example, the first relay node.

According to a fifteenth aspect, a communications device is provided. A first device communicates with a second device by using at least one communications device, and the at least one communications device does not have a packet data convergence protocol PDCP entity. The communications device includes:

a transceiver module, configured to receive a first data unit group transmitted by the first device; and a processing module, configured to add numbers to data units in the first data unit group.

It should be noted that the communications device in this embodiment of this application may correspond to the relay node in the foregoing method, for example, the first relay node.

With reference to the fifteenth aspect, in a first possible implementation of the fifteenth aspect, the processing module is further configured to add the numbers to the data units in the first data unit group based on receiving order.

With reference to the fifteenth aspect or the first possible implementation of the fifteenth aspect, in a second possible implementation, the processing module is further configured to order the data units in the first data unit group.

With reference to the fifteenth aspect, or the first or the second possible implementation of the fifteenth aspect, in a third possible implementation, an adaptation layer of the communications device has an ordering function; or a radio link control RLC entity of the communications device has an ordering function; and/or the adaptation layer of the communications device has a numbering function.

With reference to the third possible implementation of the fifteenth aspect, in a fourth possible implementation, the adaptation layer is located above the radio link control RLC entity.

With reference to the third possible implementation of the fifteenth aspect, in a fifth possible implementation, the adaptation layer is located above a media access control MAC entity.

According to a sixteenth aspect, a communications device is provided. A first device communicates with a second device by using at least one communications device, and the at least one communications device does not have a packet data convergence protocol PDCP entity. The communications device includes:

a transceiver module, configured to receive a data unit transmitted by a relay node that is connected to the communications device, where the data unit has a number; and a processing module, configured to order the data unit having the number.

It should be noted that the communications device in this embodiment of this application may correspond to the relay node in the foregoing method, for example, the second relay node, that is, the communications device may be an intermediate relay node.

With reference to the sixteenth aspect, in a first possible implementation of the sixteenth aspect, the number is added by a first relay node, and the first relay node is a relay node that directly communicates with the first device; or the number is added by a relay node that directly communicates with the communications device.

With reference to the first possible implementation of the sixteenth aspect, in a second possible implementation, an adaptation layer of the first relay node has an ordering function; or a radio link control RLC entity of the first relay node has an ordering function; and/or the adaptation layer of the first relay node has a numbering function.

With reference to the sixteenth aspect or the first possible implementation of the sixteenth aspect, in a third possible implementation, an adaptation layer of the communications device has an ordering function; or a radio link control RLC entity of the communications device has an ordering function.

With reference to the second or the third possible implementation of the sixteenth aspect, in a fourth possible implementation, the adaptation layer is located above the radio link control RLC entity.

With reference to the second or the third possible implementation of the sixteenth aspect, in a fifth possible implementation, the adaptation layer is located above a media access control MAC entity.

According to a seventeenth aspect, a communications device is provided. A first device communicates with a second device by using at least one communications device, and the at least one relay node does not have a packet data convergence protocol PDCP entity. The communications device includes:

a transceiver module, configured to receive a data unit having a number and transmitted by the at least one relay node; and a processing module, configured to order the data unit based on the number, where the transceiver module is further configured to transmit a first data unit group to the first device in order based on the number, where the first data unit group includes the ordered data unit.

It should be noted that the communications device in this embodiment of this application may correspond to the relay node in the foregoing method, for example, the first relay node.

In the technical solution of this embodiment of this application, the first relay node can add numbers to data units or order data units, thereby avoiding a packet loss problem generated because a data unit is beyond a receive window of a receive end, and improving accuracy of data transmission and efficiency of data transmission.

With reference to the seventeenth aspect, in a first possible implementation of the seventeenth aspect, the number is added by an adaptation layer of the second device.

With reference to the seventeenth aspect, in a second possible implementation of the seventeenth aspect, an adaptation layer of the communications device has an ordering function; or a radio link control RLC entity of the communications device has an ordering function.

With reference to the second possible implementation of the seventeenth aspect, in a third possible implementation, the adaptation layer is located above the radio link control RLC entity.

With reference to the second possible implementation of the seventeenth aspect, in a fourth possible implementation, the adaptation layer is located above a media access control MAC entity.

According to an eighteenth aspect, a communications device is provided. A first device communicates with a second device by using at least one communications device, and the at least one relay node does not have a packet data convergence protocol PDCP entity. The communications device includes:

a transceiver module, configured to receive a data unit transmitted by a relay node that is connected to the communications device, where the data unit has a number; and a processing module, configured to order the data unit having the number.

It should be noted that the communications device in this embodiment of this application may correspond to the relay node in the foregoing method, for example, the second relay node, that is, the communications device may be an intermediate relay node.

In the technical solution of this embodiment of this application, the second relay node can order data units that have numbers, thereby avoiding a packet loss problem generated because a data unit is beyond a receive window of a receive end, and improving accuracy of data transmission and efficiency of data transmission.

With reference to the eighteenth aspect, in a first possible implementation of the eighteenth aspect, the number is added by an adaptation layer of the second device; or the number is added by a relay node that directly communicates with the second relay node.

With reference to the first possible implementation of the eighteenth aspect, in a second possible implementation, an adaptation layer of the communications device has an ordering function; or a radio link control RLC entity of the communications device has an ordering function.

With reference to the second possible implementation of the eighteenth aspect, in a third possible implementation, the adaptation layer is located above the radio link control RLC entity.

With reference to the second possible implementation of the eighteenth aspect, in a fourth possible implementation, the adaptation layer is located above a media access control MAC entity.

According to a nineteenth aspect, a communications device is provided. The communications device communicates with a second device by using at least one relay node, and the at least one relay node does not have a packet data convergence protocol PDCP entity. The communications device includes:

a transceiver module, configured to receive a third message, where the third message includes hop count information for communication between the first device and the second device; and a processing module, configured to determine a first sequence range based on the hop count information, where the first sequence range is used to indicate a range of sequence numbers allocated by the first device.

In the technical solution of this embodiment of this application, a maximum quantity of data units that a transmit end is allowed to transmit is controlled, thereby avoiding a packet loss problem generated because a data unit is beyond a receive window of a receive end, and improving accuracy of data transmission and efficiency of data transmission.

With reference to the nineteenth aspect, in a first possible implementation of the nineteenth aspect, the first sequence range is less than or equal to a quantity of allocated sequence numbers, and the quantity of allocated sequence numbers is a sequence number space divided by a hop count and then divided by 2.

With reference to the nineteenth aspect or the first possible implementation of the nineteenth aspect, in a second possible implementation, the third message is a broadcast message.

With reference to the nineteenth aspect or the first possible implementation of the nineteenth aspect, in a third possible implementation, the third message is a message transmitted by using dedicated signaling.

With reference to the nineteenth aspect, or the first, the second, or the third possible implementation of the nineteenth aspect, in a fourth possible implementation, the third message is transmitted by the second device.

With reference to the nineteenth aspect, or the first, the second, or the third possible implementation of the nineteenth aspect, in a fifth possible implementation, the third message is transmitted by the at least one relay node.

According to a twentieth aspect, a communications device is provided. A first device communicates with a second device by using at least one communications device, and the at least one communications device does not have a packet data convergence protocol PDCP entity. The communications device includes:

a processing module, configured to determine first hop count information, where the communications module is a relay node that directly communicates with the first device; and a transceiver module, configured to transmit a third message to the first device, where the third message includes the first hop count information, where the first hop count information is a quantity of the at least one communications device or a quantity of the at least one communications device plus 1.

It should be noted that the communications device in this embodiment of this application may correspond to the relay node in the foregoing method, for example, the first relay node.

In the technical solution of this embodiment of this application, a quantity of data units at a transmit end is controlled, thereby avoiding a packet loss problem generated because a data unit is beyond a receive window of a receive end, and improving accuracy of data transmission and efficiency of data transmission.

With reference to the twentieth aspect, in a first possible implementation of the twentieth aspect, the transceiver module is further configured to:

transmit the third message to the first device by broadcast.

With reference to the twentieth aspect, in a second possible implementation of the twentieth aspect, the transceiver module is further configured to:

transmit the third message to the first device by using dedicated signaling.

With reference to the twentieth aspect, in a third possible implementation of the twentieth aspect, the processing module is further configured to:

obtain the first hop count information by adding 1 to second hop count information broadcast by a previous-hop relay node of the communications device.

According to a twenty-first aspect, a communications device is provided. The communications device communicates with a second device by using at least one relay node, and the at least one relay node does not have a packet data convergence protocol PDCP entity. The communications device includes:

a transceiver module, configured to receive, by using the at least one relay node, a first data unit transmitted by the second device, where the first data unit carries a count value; and a processing module, configured to process the first data unit based on the count value carried in the first data unit.

In the technical solution of this embodiment of this application, a maximum edge of a transmit window exists at a transmit end, a maximum edge of a receive window does not exist at a receive end, and a data unit carrying a count value is transmitted, so that the data unit is processed, thereby avoiding a packet loss problem generated because a data unit is beyond the receive window of the receive end, and improving accuracy of data transmission and efficiency of data transmission.

With reference to the twenty-first aspect, in a first possible implementation of the twenty-first aspect, the processing module is further configured to:

if the count value of the first data unit is greater than a count value next to a count value of a last data unit currently already delivered, store the first data unit; or if the count value of the first data unit is equal to a count value next to a count value of a last data unit currently already delivered, deliver the first data unit to an upper layer of a packet data convergence protocol PDCP entity; or if the count value of the first data unit is less than a count value next to a count value of a last data unit currently already delivered, discard the first data unit.

With reference to the first possible implementation of the twenty-first aspect, in a second possible implementation, the communications device further includes:

a storage module, configured to store the first data unit, and deliver the first data unit to the upper layer of the PDCP entity in order based on the count value of the first data unit.

With reference to the twenty-first aspect, or the first or the second possible implementation of the twenty-first aspect, in a third possible implementation, the first data unit is in the first sequence range.

With reference to the third possible implementation of the twenty-first aspect, in a fourth possible implementation, the first sequence range indicates a range of count values that the second device is allowed to allocate or a range of count values that the second device is allowed to allocate when transmitting the first data unit.

With reference to the third or the fourth possible implementation of the twenty-first aspect, in a fifth possible implementation, a size of the first sequence range is half of a sequence number space or less than half of a sequence number space.

According to a twenty-second aspect, a communications device is provided. A first device communicates with the communications device by using at least one relay node, and the at least one relay node does not have a packet data convergence protocol PDCP entity. The communications device includes:

a transceiver module, configured to transmit a first data unit to the first device by using the at least one relay node, where the first data unit carries a count value, where the first data unit belongs to a first sequence range, and the first sequence range is used to indicate a range of count values that the second device is allowed to allocate.

With reference to the twenty-second aspect, in a first possible implementation of the twenty-second aspect, a size of the first sequence range is half of a sequence number space or less than half of a sequence number space.

According to a twenty-third aspect, a communications device is provided. The communications device communicates with a second device by using at least one relay node, and the at least one relay node does not have a packet data convergence protocol PDCP entity. The communications device includes:

a transceiver, configured to transmit a first data unit group, where the first data unit group is in a first sequence range, where the transceiver is further configured to receive first information by using the at least one relay node, where the first information is used to indicate a data unit that the second device has received and/or has not received in the first data unit group; and a processor, configured to determine a second sequence range based on the first information.

With reference to the twenty-third aspect, in a first possible implementation of the twenty-third aspect, the processor is further configured to:

if the first information includes information about successful reception of N consecutive data units starting from the first data unit in the first sequence range, obtain the second sequence range by shifting the first sequence range by N sequences, where N is a positive integer.

With reference to the twenty-third aspect or the first possible implementation of the twenty-third aspect, in a second possible implementation, the transceiver is further configured to:

receive a first message transmitted by the second device and forwarded by the at least one relay node, where the first message includes the first information.

With reference to the second possible implementation of the twenty-third aspect, in a third possible implementation, the first message is a status report of a PDCP entity; or the first message is a status report of a radio link control RLC entity.

With reference to the twenty-third aspect or the first possible implementation of the twenty-third aspect, in a fourth possible implementation, the transceiver is further configured to receive a second message obtained by the at least one relay node based on a first message transmitted by the second device, where the second message includes the first information.

With reference to the fourth possible implementation of the twenty-third aspect, in a fifth possible implementation, the second message is determined by the at least one relay node based on the first message and a mapping relationship between numbers of data units transmitted and received that is maintained by the at least one relay node.

With reference to the fifth possible implementation of the twenty-third aspect, in a sixth possible implementation, the second message is a status report of an RLC entity.

With reference to the second or the third possible implementation of the twenty-third aspect, in a seventh possible implementation, the first message is a periodically transmitted message.

With reference to the second possible implementation of the twenty-third aspect, in an eighth possible implementation, the transceiver is further configured to transmit a query request to the second device.

According to a twenty-fourth aspect, a communications device is provided. A first device communicates with a second device by using at least one communications device, and the at least one communications device does not have a packet data convergence protocol PDCP entity. The communications device includes:

a transceiver, configured to receive first information transmitted by a previous-hop relay node of the first relay node or the second device, where the first information is used to indicate a data unit that the second device has received and/or has not received in a first data unit group, and the first data unit group is in a first sequence range, where the transceiver is further configured to forward the first information.

It should be noted that the communications device in this embodiment of this application may correspond to the relay node in the foregoing method, for example, the first relay node.

According to a twenty-fourth aspect, a communications device is provided. A first device communicates with a second device by using at least one communications device, and the at least one communications device does not have a packet data convergence protocol PDCP entity. The communications device includes:

a transceiver, configured to receive first information transmitted by the second device, where the first information is used to indicate a data unit that the second device has received and/or has not received in a first data unit group, and the first data unit group is in a first sequence range; and a processor, configured to generate a second message, where the second information is determined based on a mapping relationship between numbers of data units transmitted and received that is maintained by the communications device and the first information, where the transceiver is further configured to transmit the second information.

It should be noted that the communications device in this embodiment of this application may correspond to the relay node in the foregoing method, for example, the first relay node.

According to a twenty-fourth aspect, a communications device is provided. A first device communicates with a second device by using at least one communications device, and the at least one communications device does not have a packet data convergence protocol PDCP entity. The communications device includes:

a transceiver, configured to receive a first data unit group transmitted by the first device; and a processor, configured to add numbers to data units in the first data unit group.

It should be noted that the communications device in this embodiment of this application may correspond to the relay node in the foregoing method, for example, the first relay node.

With reference to the twenty-fourth aspect, in a first possible implementation of the twenty-fourth aspect, the processor is further configured to add numbers to data units in the first data unit group based on receiving order.

With reference to the twenty-fourth aspect or the first possible implementation of the twenty-fourth aspect, in a second possible implementation, the processor is further configured to order the data units in the first data unit group.

With reference to the twenty-fourth aspect, or the first or the second possible implementation of the twenty-fourth aspect, in a third possible implementation, an adaptation layer of the communications device has an ordering function; or a radio link control RLC entity of the communications device has an ordering function; and/or the adaptation layer of the communications device has a numbering function.

With reference to the third possible implementation of the twenty-fourth aspect, in a fourth possible implementation, the adaptation layer is located above the radio link control RLC entity.

With reference to the third possible implementation of the twenty-fourth aspect, in a fifth possible implementation, the adaptation layer is located above a media access control MAC entity.

According to a twenty-fifth aspect, a communications device is provided. A first device communicates with a second device by using at least one communications device, and the at least one communications device does not have a packet data convergence protocol PDCP entity. The communications device includes:

a transceiver, configured to receive a data unit transmitted by a relay node that is connected to the communications device, where the data unit has a number; and a processor, configured to order the data unit having the number.

It should be noted that the communications device in this embodiment of this application may correspond to the relay node in the foregoing method, for example, the second relay node, that is, the communications device may be an intermediate relay node.

With reference to the twenty-fifth aspect, in a first possible implementation of the twenty-fifth aspect, the number is added by a first relay node, and the first relay node is a relay node that directly communicates with the first device; or the number is added by a relay node that directly communicates with the communications device.

With reference to the first possible implementation of the twenty-fifth aspect, in a second possible implementation, an adaptation layer of the first relay node has an ordering function; or a radio link control RLC entity of the first relay node has an ordering function; and/or the adaptation layer of the first relay node has a numbering function.

With reference to the twenty-fifth aspect or the first possible implementation of the twenty-fifth aspect, in a third possible implementation, an adaptation layer of the communications device has an ordering function; or a radio link control RLC entity of the communications device has an ordering function.

With reference to the second or the third possible implementation of the twenty-fifth aspect, in a fourth possible implementation, the adaptation layer is located above the radio link control RLC entity.

With reference to the second or the third possible implementation of the twenty-fifth aspect, in a fifth possible implementation, the adaptation layer is located above a media access control MAC entity.

According to a twenty-sixth aspect, a communications device is provided. The communications device communicates with a second device by using at least one relay node, and the at least one relay node does not have a packet data convergence protocol PDCP entity. The communications device includes:

a transceiver, configured to receive a third message, where the third message includes hop count information for communication between the first device and the second device; and a processor, configured to determine a first sequence range based on the hop count information, where the first sequence range is used to indicate a range of sequence numbers allocated by the first device.

In the technical solution of this embodiment of this application, a maximum quantity of data units that a transmit end is allowed to transmit is controlled, thereby avoiding a packet loss problem generated because a data unit is beyond a receive window of a receive end, and improving accuracy of data transmission and efficiency of data transmission.

With reference to the twenty-sixth aspect, in a first possible implementation of the twenty-sixth aspect, the first sequence range is less than or equal to a quantity of allocated sequence numbers, and the quantity of allocated sequence numbers is a sequence number space divided by a hop count and then divided by 2.

With reference to the twenty-sixth aspect or the first possible implementation of the twenty-sixth aspect, in a second possible implementation, the third message is a broadcast message.

With reference to the twenty-sixth aspect or the first possible implementation of the twenty-sixth aspect, in a third possible implementation, the third message is a message transmitted by using dedicated signaling.

With reference to the twenty-sixth aspect, or the first, the second, or the third possible implementation of the twenty-sixth aspect, in a fourth possible implementation, the third message is transmitted by the second device.

With reference to the twenty-sixth aspect, or the first, the second, or the third possible implementation of the twenty-sixth aspect, in a fifth possible implementation, the third message is transmitted by the at least one relay node.

According to a twenty-seventh aspect, a communications device is provided. A first device communicates with a second device by using at least one communications device, and the at least one relay node does not have a packet data convergence protocol PDCP entity. The communications device includes:

a transceiver, configured to receive a data unit having a number and transmitted by the at least one relay node; and a processor, configured to order the data unit based on the number, where the transceiver is further configured to transmit a first data unit group to the first device in order based on the number, where the first data unit group includes the ordered data unit.

It should be noted that the communications device in this embodiment of this application may correspond to the relay node in the foregoing method, for example, the first relay node.

In the technical solution of this embodiment of this application, the first relay node can add numbers to data units or order data units, thereby avoiding a packet loss problem generated because a data unit is beyond a receive window of a receive end, and improving accuracy of data transmission and efficiency of data transmission.

With reference to the twenty-seventh aspect, in a first possible implementation of the twenty-seventh aspect, the number is added by an adaptation layer of the second device.

With reference to the twenty-seventh aspect, in a second possible implementation of the twenty-seventh aspect, an adaptation layer of the communications device has an ordering function; or a radio link control RLC entity of the communications device has an ordering function.

With reference to the second possible implementation of the twenty-seventh aspect, in a third possible implementation, the adaptation layer is located above the radio link control RLC entity.

With reference to the second possible implementation of the twenty-seventh aspect, in a fourth possible implementation, the adaptation layer is located above a media access control MAC entity.

According to a twenty-eighth aspect, a communications device is provided. A first device communicates with a second device by using at least one communications device, and the at least one relay node does not have a packet data convergence protocol PDCP entity. The communications device includes:

a transceiver, configured to receive a data unit transmitted by a relay node that is connected to the communications device, where the data unit has a number; and a processor, configured to order the data unit having the number.

It should be noted that the communications device in this embodiment of this application may correspond to the relay node in the foregoing method, for example, the second relay node, that is, the communications device may be an intermediate relay node.

In the technical solution of this embodiment of this application, the second relay node can order data units that have numbers, thereby avoiding a packet loss problem generated because a data unit is beyond a receive window of a receive end, and improving accuracy of data transmission and efficiency of data transmission.

With reference to the twenty-eighth aspect, in a first possible implementation of the twenty-eighth aspect, the number is added by an adaptation layer of the second device; or the number is added by a relay node that directly communicates with the second relay node.

With reference to the first possible implementation of the twenty-eighth aspect, in a second possible implementation, an adaptation layer of the communications device has an ordering function; or a radio link control RLC entity of the communications device has an ordering function.

With reference to the second possible implementation of the twenty-eighth aspect, in a third possible implementation, the adaptation layer is located above the radio link control RLC entity.

With reference to the second possible implementation of the twenty-eighth aspect, in a fourth possible implementation, the adaptation layer is located above a media access control MAC entity.

According to a twenty-ninth aspect, a communications device is provided. A first device communicates with a second device by using at least one communications device, and the at least one communications device does not have a packet data convergence protocol PDCP entity. The communications device includes:

a processor, configured to determine first hop count information, where the communications device is a relay node that directly communicates with the first device; and a transceiver, configured to transmit a third message to the first device, where the third message includes the first hop count information, where the first hop count information is a quantity of the at least one communications device or a quantity of the at least one communications device plus 1.

It should be noted that the communications device in this embodiment of this application may correspond to the relay node in the foregoing method, for example, the first relay node.

In the technical solution of this embodiment of this application, a quantity of data units at a transmit end is controlled, thereby avoiding a packet loss problem generated because a data unit is beyond a receive window of a receive end, and improving accuracy of data transmission and efficiency of data transmission.

With reference to the twenty-ninth aspect, in a first possible implementation of the twenty-ninth aspect, the transceiver is further configured to:

transmit the third message to the first device by broadcast.

With reference to the twenty-ninth aspect, in a second possible implementation of the twenty-ninth aspect, the transceiver is further configured to:

transmit the third message to the first device by using dedicated signaling.

With reference to the twenty-ninth aspect, in a third possible implementation of the twenty-ninth aspect, the processor is further configured to:

obtain the first hop count information by adding 1 to second hop count information broadcast by a previous-hop relay node of the communications device.

According to a thirtieth aspect, a communications device is provided. The communications device communicates with a second device by using at least one relay node, and the at least one relay node does not have a packet data convergence protocol PDCP entity. The communications device includes:

a transceiver, configured to receive, by using the at least one relay node, a first data unit transmitted by the second device, where the first data unit carries a count value; and a processor, configured to process the first data unit based on the count value carried in the first data unit.

In the technical solution of this embodiment of this application, a maximum edge of a transmit window exists at a transmit end, a maximum edge of a receive window does not exist at a receive end, and a data unit carrying a count value is transmitted, so that the data unit is processed, thereby avoiding a packet loss problem generated because a data unit is beyond the receive window of the receive end, and improving accuracy of data transmission and efficiency of data transmission.

With reference to the thirtieth aspect, in a first possible implementation of the thirtieth aspect, the processor is further configured to:

if the count value of the first data unit is greater than a count value next to a count value of a last data unit currently already delivered, store the first data unit; or if the count value of the first data unit is equal to a count value next to a count value of a last data unit currently already delivered, deliver the first data unit to an upper layer of a packet data convergence protocol PDCP entity; or if the count value of the first data unit is less than a count value next to a count value of a last data unit currently already delivered, discard the first data unit.

With reference to the first possible implementation of the thirtieth aspect, in a second possible implementation, the communications device further includes:

a memory, configured to store the first data unit, and deliver the first data unit to the upper layer of the PDCP entity in order based on the count value of the first data unit.

With reference to the thirtieth aspect, or the first or the second possible implementation of the thirtieth aspect, in a third possible implementation, the first data unit is in the first sequence range.

With reference to the third possible implementation of the thirtieth aspect, in a fourth possible implementation, the first sequence range indicates a range of count values that the second device is allowed to allocate or a range of count values that the second device is allowed to allocate when transmitting the first data unit.

With reference to the third or the fourth possible implementation of the thirtieth aspect, in a fifth possible implementation, a size of the first sequence range is half of a sequence number space or less than half of a sequence number space.

According to a thirty-first aspect, a communications device is provided. A first device communicates with the communications device by using at least one relay node, and the at least one relay node does not have a packet data convergence protocol PDCP entity. The communications device includes:

a transceiver, configured to transmit a first data unit to the first device by using the at least one relay node, where the first data unit carries a count value, where the first data unit belongs to a first sequence range, and the first sequence range is used to indicate a range of count values that the second device is allowed to allocate.

With reference to the thirty-first aspect, in a first possible implementation of the thirty-first aspect, a size of the first sequence range is half of a sequence number space or less than half of a sequence number space.

According to a thirty-second aspect, a system-on-chip is provided and applied to a communications device. The system-on-chip includes at least one processor, at least one memory, and an interface circuit. The interface circuit is responsible for information exchange between the system-on-chip and the outside. The at least one memory, the interface circuit, and the at least one processor are interconnected by cables. The at least one memory stores an instruction, and the at least one processor executes the instruction to perform an operation performed by the communications device in the method in each of the foregoing aspects.

According to a thirty-third aspect, a communications system is provided and includes a communications device, where the communications device is the communications device in each of the foregoing aspects.

According to a thirty-fourth aspect, a computer program product is provided and applied to a communications device, where the computer program product includes a series of instructions, and when the instruction is run, an operation performed by the communications device in the method in each of the foregoing aspects is performed.

According to a thirty-fifth aspect, a computer-readable storage medium is provided, where the computer-readable storage medium stores an instruction, and when the instruction is run on a computer, the computer is enabled to perform the method in each of the foregoing aspects.

DESCRIPTION OF EMBODIMENTS

Figure 1:
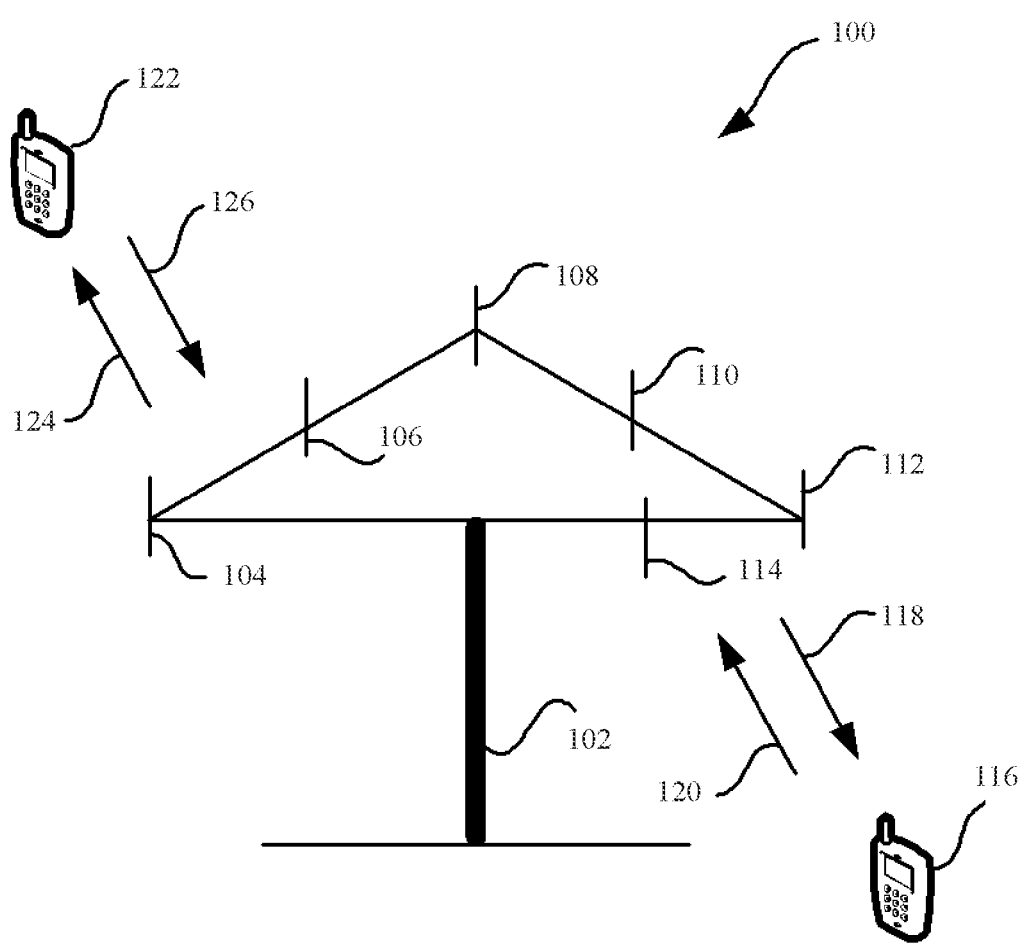
FIG. 1 is a schematic diagram of a communications system to which a data processing method in this application is applicable.

In NR in a 5G system, the applicant finds that when a relay node is a layer 2 relay not including a PDCP layer, because an RLC layer of the relay node does not have a reordering function, further disorder is caused at each hop on a basis of a previous hop during transmission in a multi-hop link. Consequently, when data processing is performed by user equipment and a donor base station in the multi-hop link in the 5G system, a packet loss problem may be generated. This severely affects accuracy of data transmission, reduces communication efficiency, and causes poor user experience. The solutions provided hereinafter can resolve the packet loss problem generated when data processing is performed by the user equipment and the donor base station in the multi-hop link in the 5G system, improve accuracy of data transmission and efficiency of data transmission, and improve user experience.

The following describes technical solutions of this application with reference to accompanying drawings.

The technical solutions of the embodiments of this application may be applied to various communications systems, such as a global system for mobile communications (Global System of Mobile Communication, GSM), a code division multiple access (Code Division Multiple Access, CDMA) system, a wideband code division multiple access (Wideband Code Division Multiple Access, WCDMA) system, a general packet radio service (General Packet Radio Service, GPRS), a long term evolution (Long Term Evolution, LTE) system, an LTE frequency division duplex (Frequency Division Duplex, FDD) system, an LTE time division duplex (Time Division Duplex, TDD) system, a universal mobile telecommunications system (Universal Mobile Telecommunication System, UMTS), a worldwide interoperability for microwave access (Worldwide Interoperability for Microwave Access, WiMAX) communications system, a future 5th generation (5th Generation, 5G) system, or a new radio (New Radio, NR) system.

A terminal device in the embodiments of this application may be user equipment, an access terminal, a subscriber unit, a subscriber station, a mobile station, a mobile console, a remote station, a remote terminal, a mobile device, a user terminal, a terminal, a wireless communications device, a user agent, a user apparatus, or the like. The terminal device may alternatively be a cellular phone, a cordless phone, a session initiation protocol (Session Initiation Protocol, SIP) phone, a wireless local loop (Wireless Local Loop, WLL) station, a personal digital assistant (Personal Digital Assistant, PDA), a handheld device having a wireless communication function, a computing device, another processing device connected to a wireless modem, a vehicle-mounted device, a wearable device, a terminal device in a future 5G network, or a terminal device in a future evolved public land mobile network (Public Land Mobile Network, PLMN). This is not limited in the embodiments of this application.

A network device in the embodiments of this application may be a device for communicating with a terminal device. The network device may be a base transceiver station (Base Transceiver Station, BTS) in a global system for mobile communications (Global System of Mobile communication, GSM) system or a code division multiple access (Code Division Multiple Access, CDMA) system, or may be a NodeB (NodeB, NB) in a wideband code division multiple access (Wideband Code Division Multiple Access, WCDMA) system, or may be an evolved NodeB (Evolutional NodeB, eNB or eNodeB) in an LTE system, or may be a radio controller in a cloud radio access network (Cloud Radio Access Network, CRAN) scenario; or the network device may be a relay station, an access point, an in-vehicle device, a wearable device, a network device in a future 5G network, a network device in a future evolved PLMN network, or the like. This is not limited in the embodiments of this application.

FIG. 1 is a schematic diagram of a communications system to which a communication method in this application is applicable. As shown in FIG. 1, the communications system 100 includes a network device 102, where the network device 102 may include a plurality of antennas, for example, antennas 104, 106, 108, 110, 112 and 114. In addition, the network device 102 may additionally include a transmitter chain and a receiver chain. A person of ordinary skill in the art may understand that both the transmitter chain and the receiver chain may include a plurality of components (for example, processors, modulators, multiplexers, encoders, demultiplexers, or antennas) related to signal transmission and reception.

The network device 102 may communicate with a plurality of terminal devices (for example, a terminal device 116 and a terminal device 122). However, it may be understood that the network device 102 can communicate with any quantity of terminal devices similar to the terminal device 116 or 122. The terminal devices 116 and 122 may be, for example, cellular phones, smartphones, portable computers, handheld communications devices, handheld computing devices, satellite radio apparatuses, global positioning systems, PDAs, and/or any other appropriate devices used for communication in the wireless communications system 100.

As shown in FIG. 1, the terminal device 116 communicates with the antennas 112 and 114, where the antennas 112 and 114 transmit information to the terminal device 116 through a forward link 118, and receive information from the terminal device 116 through a reverse link 120. In addition, the terminal device 122 communicates with the antennas 104 and 106, where the antennas 104 and 106 transmit information to the terminal device 122 through a forward link 124, and receive information from the terminal device 122 through a reverse link 126.

For example, in an FDD system, for example, the forward link 118 may use a frequency band different from that used by the reverse link 120, and the forward link 124 may use a frequency band different from that used by the reverse link 126.

For another example, in a TDD system and a full duplex (full duplex) system, the forward link 118 and the reverse link 120 may use a same frequency band, and the forward link 124 and the reverse link 126 may use a same frequency band.

Each antenna (or an antenna group including a plurality of antennas) and/or an area designed for communication is referred to as a sector of the network device 102. For example, the antenna group may be designed to communicate with a terminal device in a sector of a coverage area of the network device 102. In a process in which the network device 102 communicates with the terminal devices 116 and 122 through the forward links 118 and 124 respectively, transmit antennas of the network device 102 may use beamforming to improve signal-to-noise ratios of the forward links 118 and 124. In addition, in contrast to a manner in which a network device uses a single antenna to transmit signals to all terminal devices served by the network device, when the network device 102 uses beamforming to transmit signals to the terminal devices 116 and 122 that are distributed randomly in a related coverage area, mobile devices in a neighboring cell receive less interference.

At a given time, the network device 102, the terminal device 116, or the terminal device 122 may be a wireless communications transmitting apparatus and/or a wireless communications receiving apparatus. When transmitting data, the wireless communications transmitting apparatus may encode data for transmission. Specifically, the wireless communications transmitting apparatus may obtain (for example, generate, receive from another communications apparatus, or store in a memory) a quantity of data bits that need to be transmitted to the wireless communications receiving apparatus through a channel. Such data bits may be included in a transport block (or a plurality of transport blocks) of data, and the transport block may be segmented to generate a plurality of code blocks.

In addition, the communications system 100 may be a PLMN network or a device-to-device (device-to-device, D2D) network or a machine to machine (machine to machine, M2M) network or another network. FIG. 1 is merely a simplified schematic diagram of an example, and the network may further include other network devices not shown in FIG. 1.

Figures 2, 3:
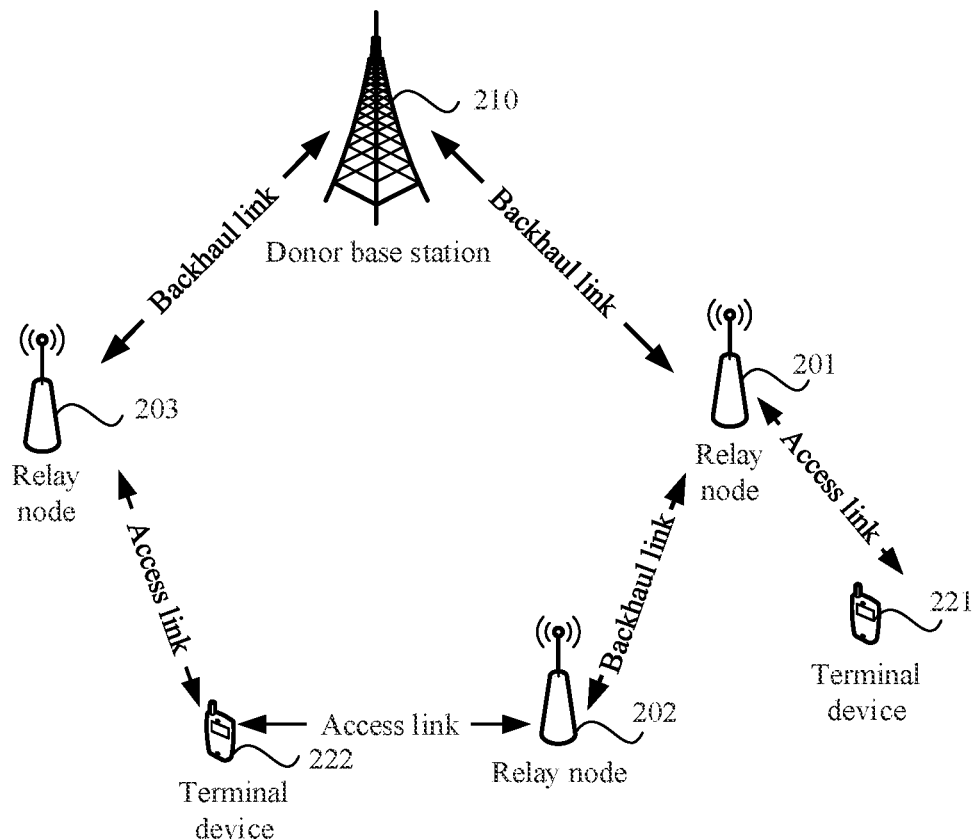
FIG. 2 is a schematic structural diagram of a scenario 200 of a data processing method according to an implementation of this application.
FIG. 3 is a schematic structural diagram of a count value (COUNT) of a data unit according to an embodiment of this application.

FIG. 2 is a schematic diagram of a system 200 to which a communication method according to an embodiment of this application is applicable. FIG. 2 is a structural diagram of a possible IAB network in 5G. The system 200 includes access network devices. The access network devices include a donor base station (Donor 5G NodeB, DgNB) 210 and one or more relay nodes (Relay Node, RN), for example, a relay node 201, a relay node 102, and a relay node 203. An access network device may communicate with a plurality of terminal devices (for example, a terminal device 221 and a terminal device 222).

In the structural diagram of the IAB network shown in FIG. 2, the network structure supports an integrated access and backhaul technology based on a 5G new radio technology. In FIG. 2, the donor base station may be directly connected to a core network. For example, a plurality of relay nodes may be connected to the donor base station, and one relay node may be connected to another relay node. Herein, the relay node may be a base station. Paths between base stations, for example, a path between the donor base station and a relay node and a path between relay nodes, may be all referred to as backhaul paths. A terminal device may be connected to the donor base station or a relay node. A direct connection between the terminal device and the donor base station is a one-hop path. The terminal device may be further connected to the donor base station by using one or more relay nodes. In this case, the connection is a multi-hop path. Paths between terminal devices and base stations, for example, a path between the donor base station and a terminal device and a path between a relay node and a terminal device, may be all referred to as access paths.

It should be noted that in an application scenario shown in FIG. 2, a terminal device may communicate with the donor base station by using a plurality of relay nodes. On one hand, a relay node may provide large network coverage to reduce communication costs; on the other hand, a communication method for wireless transmission is provided by using the relay node.

It should be understood that FIG. 2 is merely a simplified schematic diagram of an example, and the network may further include other access network devices not shown in FIG. 2.

When data units are transmitted over an air interface of a 5G system, although the data units (service data units) are transmitted over an air interface of a transmit end (transmitting device) in order, reception at a receive end (receiving device) may be disordered due to parallel running of a plurality of HARQ processes. Sequence numbers (Sequence Number, SN) are added to the data units at a PDCP layer of the transmit end. A receiving PDCP entity performs reordering and duplicate detection by using the SNs, to ensure that the data units are delivered in order and that duplicate units are detected. The transmit end and the receive end further need to maintain a same hyper frame number (Hyper Frame Number, HFN). A purpose of using the HFN is to reduce a quantity of bits transmitted over the air interface, that is, only a sequence number needs to be transmitted. An SN and an HFN constitute a count (COUNT) value of a data unit. Each data unit has a count value. Transmission is performed over the air interface of the transmit end (transmitting device) in ascending order of count values of the data units. The transmit end needs to maintain a quantity of transmitted SNs so that it does not exceed half of a total quantity of SNs, to avoid disorder of frame numbers. Likewise, the receive end also uses a length of half of a quantity of SNs as a receive window. At the receive end, received data units may also be disordered. However, because a quantity of data units transmitted by the transmit end over the air interface does not exceed half of the quantity of SNs, the received data units are generally disordered when delivered to the PDCP layer. Although the data units are disordered, the data units are in the receive window. The PDCP layer orders the data units in the receive window based on the count values, and delivers the data units to an upper layer in order of the count values.

FIG. 3 is a schematic structural diagram of a count (COUNT) value of a data unit. As can be learned from FIG. 3, the count value of the data unit includes an SN field and an HFN field, where a sum of a quantity of bits (bit) of the HFN field part and a quantity of bits (bit) of the SN field part is 32 bits, that is, a COUNT field in the data unit is 32 bits.

In 5G NR, a PDCP entity of the receiving device reorders the received data units based on the count values of the data units (service data units). The ordering and delivering process of the data units is as follows:

after receiving a data unit, first inferring a currently received count value based on an SN number of the data unit and a maintained HFN;

determining whether the count value of the received data unit is in a valid receive window, that is, whether the count value is greater than or equal to a next to-be-delivered count value; and if the count value is not in the valid receive window, discarding the received data unit; or if the count value is in the valid receive window, storing the valid data unit in a PDCP layer, and then delivering the data units in order.

Figure 4:
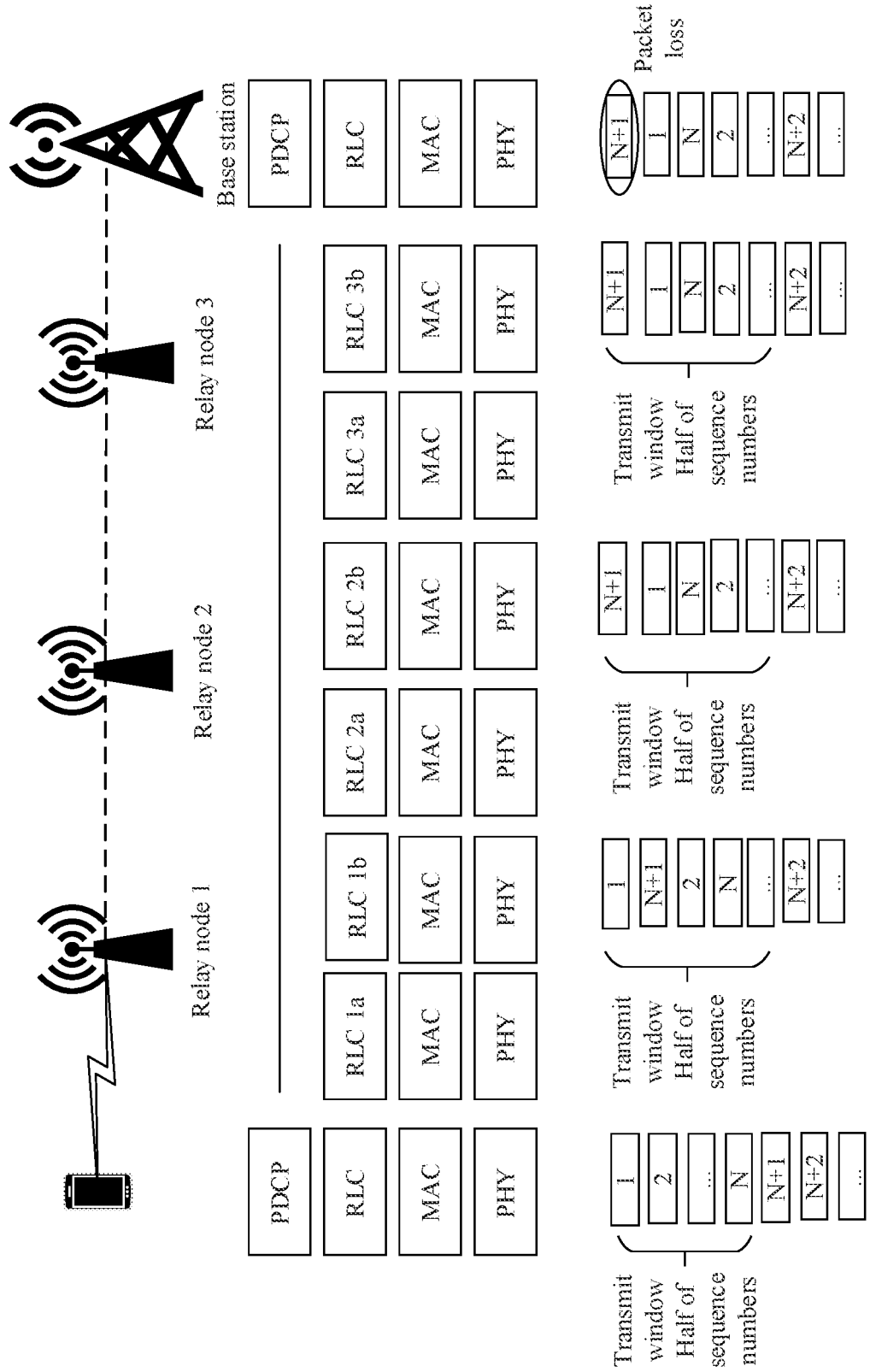
FIG. 4 is a schematic diagram of a data unit processing method according to an embodiment of this application.

FIG. 4 is a schematic flowchart of a data unit processing method in the prior art. The data unit processing method in FIG. 3 may be applied to the communications system shown in FIG. 2.

It should be noted that for data to be transmitted in acknowledged mode (AM DRB), a range of sequence numbers to be transmitted is controlled by feedback of an RLC layer. This is a visual method for controlling transmission of data of not more than half of SNs; for data to be transmitted in unacknowledged mode (UM DRB), a range of sequence numbers to be transmitted may be controlled by feedback of a HARQ process of MAC, so that data of not more than half of SNs is transmitted.

In a scenario f a multi-hop link of IAB, because a multi-hop link exists, disordered transmission of data units may occur. As shown in FIG. 4, a terminal device transmits data units whose sequence numbers are 1 to N in a transmit window, where the transmit window is a range of sequence numbers that a transmit end can transmit currently. Due to disorder on an air interface, a first relay node receives disordered data units. For example, as shown in FIG. 4, in a possible case, the first relay node may successfully receive a data unit numbered N+1 after receiving a data unit numbered 1 that is transmitted by the transmit end, but data units numbered 2 to N are all in a retransmitted state.

Data units received in disorder at the first hop continue to be transmitted in receiving order, that is, in disorder. For example, the disordered data units received by the relay node 1 continue to be transmitted to a relay node 2. However, the transmit end determines, based on feedback about the data units received at the first hop, a range of allocated sequence numbers, which is referred to as a "transmit window". To be specific, more data may be transmitted by the transmit end to the first-hop node. Consequently, data units (for example, the data units whose sequence numbers are 1 to N) in a receive window and data units (for example, other data units than the data units whose sequence numbers are 1 to N) beyond the receive window are transmitted simultaneously over the air interface. Because transmission over an air interface at a second hop is still disordered, data in the receive window may arrive at a receive end earlier than data beyond the receive window. Consequently, data units received by the receive end are beyond the receive window, and the receive end discards the data units.

It should be noted that in a transmission process of a data unit, the receive end can recognize only a data unit in the receive window corresponding to the transmit window of the transmit end, and a data unit beyond the receive window may be recognized by the receive end as expired data. Therefore, a case of incorrectly considering that the data unit has been received and discarding the data unit may occur. For example, if sequence numbers of corresponding data units in the transmit window are 1 to N, the receive end can recognize the data units whose sequence numbers are 1 to N in the receive window, but other data units than the data units whose sequence numbers are 1 to N are discarded because the other data units are considered as data units already received in a previous round.

Uplink data transmission in acknowledged mode (Acknowledge Mode, AM) is shown in FIG. 4. Assuming that all transmitted PDCP SNs are 2N numeric values, N PDCP data units may be transmitted simultaneously over the air interface at a time. In this case, no data packet falls beyond the window due to disorder on the air interface at the first-hop receive end. When receiving feedback about the data unit numbered 1 from the first-hop receive end, the transmit end may transmit the data unit numbered N+1.

Considering a possible case of reception, after receiving the data unit numbered 1, the first-hop receive end (relay node 1) first receives the data unit numbered N+1 that is transmitted by the transmit end, and then receives a data unit numbered 2. Because an RLC layer in a 5G system does not have a reordering function any longer, a PDCP layer in a layer-2 protocol stack is responsible for reordering received disordered data units. However, a relay node does not have a PDCP layer and therefore cannot perform reordering. The relay node 1 transmits (1, N+1, 2, N . . . ) in order of currently received data units. During reception at a second-hop receive end (relay node 2), the PDCP data unit numbered N+1 may be first received due to disorder, and receiving order may be (N+1, 1, N, 2 . . . ). When the data units are transmitted to a donor base station, order of receiving the data units may be (N+1, 1, N, 2 . . . ). Because numbers 1 to N are currently in the receive window, the data unit numbered N+1 is directly considered as being beyond the receive window and is discarded.

Figure 5:
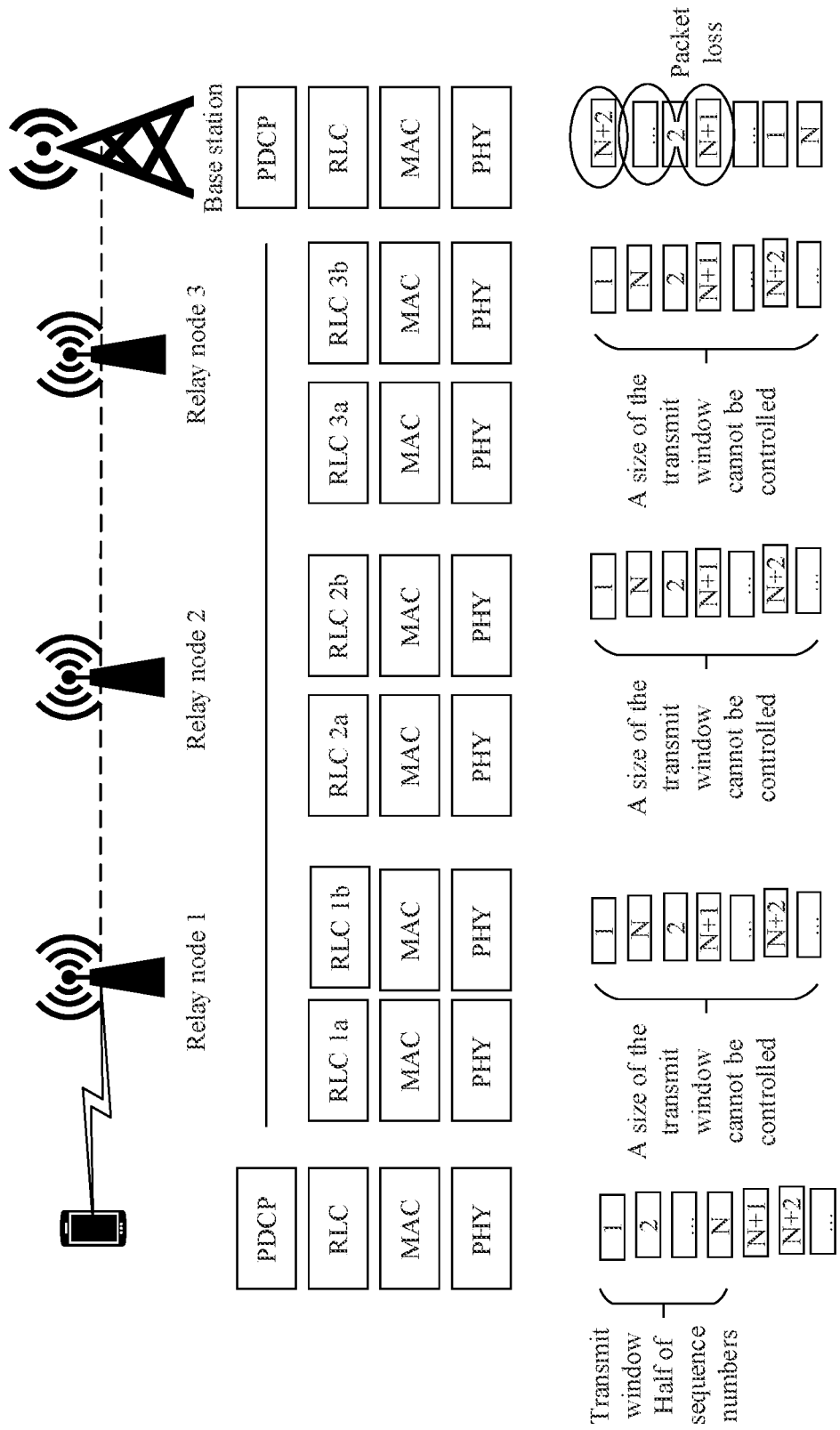
FIG. 5 is a schematic diagram of a data unit processing method according to an embodiment of this application.

Uplink data transmission in unacknowledged mode (Unacknowledged Mode, UM) is shown in FIG. 5. In UM mode, an RLC layer does not number a data unit that is not segmented. Therefore, from a perspective of RLC, with respect to data units delivered by an upper layer to RLC, an air interface may transmit all the data units if air interface resources permit. However, because the data units on the air interface are disordered and a size of a transmit window on an air interface between relays is uncontrolled, plenty of data units beyond the window may be lost when a receive end receives the data units.

According to the embodiments of this application, it can be ensured that the data unit in the receive window encounters no packet loss that is caused when the data unit is beyond the receive window. The following describes in detail the embodiments of this application with reference to specific examples. It should be noted that the examples are merely intended to help a person skilled in the art better understand the embodiments of this application, but are not intended to limit the scope of the embodiments of this application.

It should be understood that an application scenario of this application may be data processing performed by a terminal device and a donor base station after an entire control plane between the terminal device and the donor base station is established in a 5G system or a future communications system.

Figure 6:
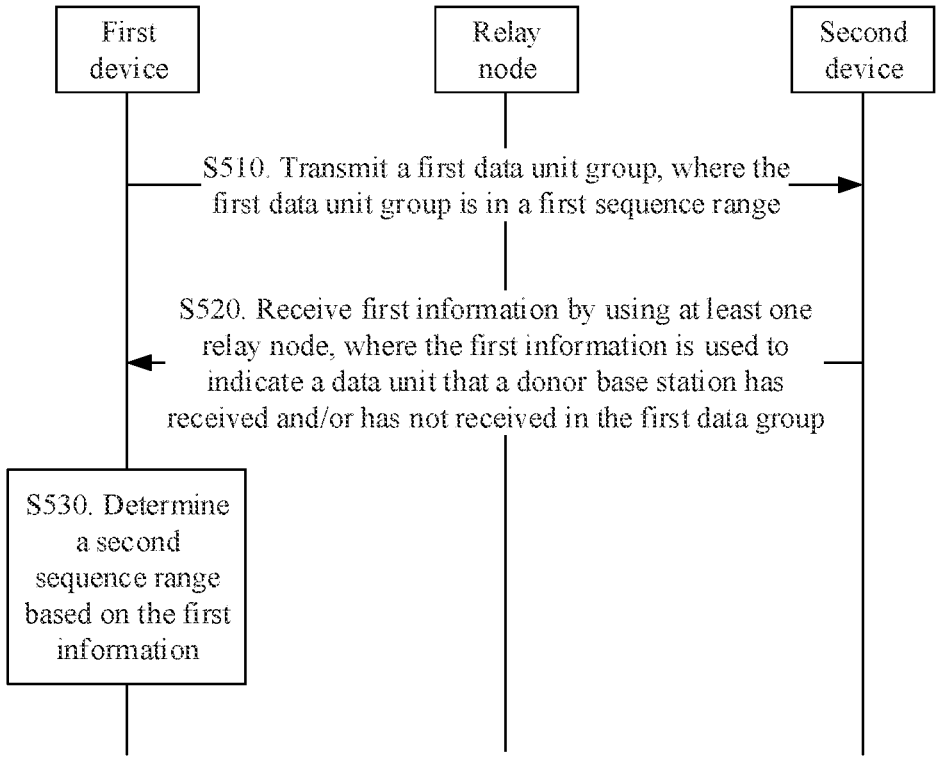
FIG. 6 is a schematic interaction flowchart of a data unit processing method according to an embodiment of this application.

FIG. 6 is a schematic flowchart of a communication method 500 according to an embodiment of this application. The communication method 500 may be applied to an uplink transmission scenario in the scenario shown in FIG. 2, or certainly may be applied to another communication scenario. This is not limited in this embodiment of this application. The communication method 500 includes the following steps.

S510. A first device transmits a first data unit group, where the first data unit group is in a first sequence range. Herein, using an uplink transmission scenario as an example, for example, the first device may be a terminal device, and the second device may be a donor base station.

It should be noted that the first sequence range is a range of data units that the terminal device can transmit.

S520. The first device receives first information by using at least one relay node, where the first information is used to indicate a data unit that the second device has received and/or has not received in the first data unit group. For example, the terminal device receives first information by using the at least one relay node, where the first information is used to indicate a data unit that the donor base station has received and/or has not received in the first data unit group.

S530. The first device determines a second sequence range based on the first information. For example, the terminal device determines the second sequence range based on the first information.

In this embodiment of this application, the first device may transmit data units in the first sequence range, and the first device determines the second sequence range based on the first information about the data unit that the second device has received and/or has not received in the first data unit group, thereby avoiding a packet loss problem generated because a data unit is beyond a receive window of a receive end, and improving accuracy of data transmission and efficiency of data transmission.

Optionally, in an embodiment of this application, that the first device determines a second sequence range based on the first information includes:

if the first information includes information about successful reception of N consecutive data units starting from the first data unit in the first sequence range, the first device obtains the second sequence range by shifting the first sequence range by N sequences, where N is a positive integer.

For example, the first sequence range may be a transmit window of the terminal device, and the first sequence range is data units whose sequence numbers are 1 to 10. The first data unit group may be data units numbered 1 to 10. When the first information includes information about successful reception of the data unit numbered 1 and the data unit numbered 2 by the second device, it is determined, by shifting the first sequence range by two sequences, that the second sequence range is number 3 to number 13.

It should be noted that when the first information includes information about successful reception of the data unit numbered 1 and the data unit numbered 5 by the donor base station, it is determined, by shifting the first sequence range by one sequence, that the second sequence range is number 2 to number 11. If the first information includes information about successful reception of a data packet numbered 2 and a data packet numbered 3 by the donor base station, the first sequence range is not shifted. It should be understood that when the first information includes information about successful reception of N consecutive data units starting from the first data unit by the donor base station, that is, when information about successful reception of N consecutive data units starting from the data unit numbered 1 is received, the second sequence is determined by shifting the first sequence range by N sequences.

It should be understood that the first sequence range may be the transmit window of the terminal device, and the transmit window may be less than or equal to half of an SN space.

It should be understood that the first sequence range is a sequence number range of data units that the terminal device can transmit, and a range of sequence numbers transmitted by the terminal device should be in the first sequence range. After the second sequence range is determined, sequence numbers transmitted by the terminal device should be in the second sequence range. Optionally, in an embodiment of this application, a first message received by the first device may be a message transmitted by the second device, and the first device receives, from the second device, the first message forwarded by the at least one relay node.

For example, the terminal device receives a first message transmitted by the donor base station and forwarded by the at least one relay node, where the first message includes the first information used to indicate the data unit that the donor base station has received and/or has not received in the first data unit group.

For example, the first data unit group includes a data unit a, a data unit b, a data unit c, a data unit d, and a data unit e, where sequence numbers of the five data units may be numbers 1 to 5. The terminal device transmits the first data unit group to the donor base station by using the at least one relay node. The donor base station receives data units numbered 1 to 3, but does not receive data units numbered 4 and 5. In this case, the donor base station transmits first information, where the first information includes information about the data units numbered 1 to 3 that the donor base station has received and the data units numbered 4 and 5 that the donor base station has not received. The donor base station transmits a first message to the at least one relay node, and the at least one relay node forwards the first message to forward the first message to the terminal device, where the first message includes the first information.

It should be understood that in this embodiment, the at least one relay node merely forwards the first message transmitted by the donor base station and finally transmits the first message to the terminal device, and the relay node does not process the first message.

Optionally, in an embodiment, a first relay node receives the first information transmitted by a previous-hop relay node of the first relay node or the second device, where the first information is used to indicate the data unit that the second device has received and/or has not received in the first data unit group, and the first data unit group is in the first sequence range; and the first relay node forwards the first information.

Optionally, the first message may be a status report of a PDCP entity that is transmitted by the donor base station; or the first message may be a status report of an RLC entity that is transmitted by the donor base station.

In an embodiment of this application, the first message may be a message periodically transmitted by the donor base station to the terminal device.

In an embodiment of this application, the first message may be a message transmitted by the donor base station to the terminal device when the terminal device transmits a query request to the donor base station, for example, when a status of receiving the first data unit group by the donor base station is queried.

Optionally, in an embodiment of this application, the terminal device receives a second message obtained by the at least one relay node based on the first message transmitted by the donor base station, where the second message includes the first information used to indicate the data unit that the donor base station has received and/or has not received in the first data unit group. The second message is determined by the at least one relay node based on the first message and a mapping relationship between numbers of data units transmitted and received that is maintained by the at least one relay node.

In an example, it is assumed that the terminal device communicates with the donor base station by using a relay node 1 and a relay node 2, that is, terminal device-relay node 1-relay node 2-donor base station. The terminal device transmits the five data units a, b, c, d, and e to the donor base station. An RLC entity of the terminal device adds headers to the five data units separately, where the headers include numbers a-1, b-2, c-3, d-4, and e-5. The terminal device first transmits the five data units to the relay node 1, and the relay node 1 maintains a mapping relationship between numbers of data units transmitted and received.

For example, the mapping relationship maintained by the relay node 1 is 1-6, 2-7, 3-8, 4-9, and 5-10. To be specific, the headers 1, 2, 3, 4, and 5 of the five data units a, b, c, d, and e are removed at the relay node 1, and then new headers a-6, b-7, c-8, d-9, and e-10 are added to the data units. Then the relay node 1 transmits the five data units to the relay node 2, and the relay node 2 also maintains a mapping relationship between numbers of data units transmitted and received.

For example, the mapping relationship maintained by the relay node 2 is 6-11, 7-12, 8-13, 9-14, and 10-15. To be specific, the headers 6, 7, 8, 9, and 10 of the five data units a, b, c, d, and e, which are added at the relay node 1, are removed at the relay node 2, and then new headers a-11, b-12, c-13, d-14, and e-15 are added to the data units. The relay node 2 transmits the five data units to the donor base station. For example, if the donor base station successfully receives data units whose headers are 11, 12, and 13, but does not successfully receive data units whose headers are 14 and 15, a PDCP layer of the donor base station can recognize that data units whose headers 11, 12, and 13 are removed are the data unit a, the data unit b, and the data unit c. In this case, the donor base station transmits a first message indicating that the donor base station has received the data unit a, the data unit b, and the data unit c but has not received the data units whose headers are 14 and 15. To be specific, the donor base station transmits the first message to the relay node 2, indicating that the donor base station has successfully received the data units whose headers are 11, 12, and 13 but has not received the data units whose headers are 14 and 15. Based on the maintained mapping relationship between numbers of data units transmitted and received, that is, 6-11, 7-12, 8-13, 9-14, and 10-15, the relay node 2 transmits, to a relay node, that is, transmits, to the relay node 1, a processed first message indicating that the donor base station has successfully received data units whose headers are 6, 7, and 8 but has not received data units whose headers are 9 and 10. Based on the maintained mapping relationship between numbers of data units transmitted and received, that is, 1-6, 2-7, 3-8, 4-9, and 5-10, the relay node 1 transmits, to a terminal, that is, transmits, to the terminal device, a second message obtained by processing the first message, indicating that the donor base station has successfully received data units whose headers are 1, 2, and 3 but has not received data units whose headers are 4 and 5. After receiving the second message, the terminal device can know that the donor base station has successfully received the data unit a, the data unit b, and the data unit c but has not received the data unit d and the data unit e. The second message may be a status report of an RLC entity.

Optionally, in an embodiment, the first relay node receives the first information transmitted by the second device, where the first information is used to indicate the data unit that the second device has received and/or has not received in the first data unit group, and the first data unit group is in the first sequence range; and the first relay node transmits second information, where the second information is determined based on the mapping relationship between numbers of data units transmitted and received that is maintained by the first relay node and the first information, and the second information is used to indicate the data unit that the second device has received and/or has not received in the first data unit group.

It should be noted that the mapping relationships between numbers that are maintained by the relay node 1 and the relay node 2 may be mapping relationships between RLC entity numbers of data units received by the relay nodes and RLC entity numbers of data units transmitted by the relay nodes to next-hop relay nodes, that is, mapping relationships between numbers of data units received by the relay nodes and numbers of data units transmitted by the relay nodes.

It should be understood that in the description of the foregoing embodiment, in an uplink transmission scenario, the first device may be a terminal device, and the second device may be a donor base station. In a downlink transmission scenario, the first device may be a donor base station, and the second device may be a terminal device. This is not limited in this application.

Figure 7:
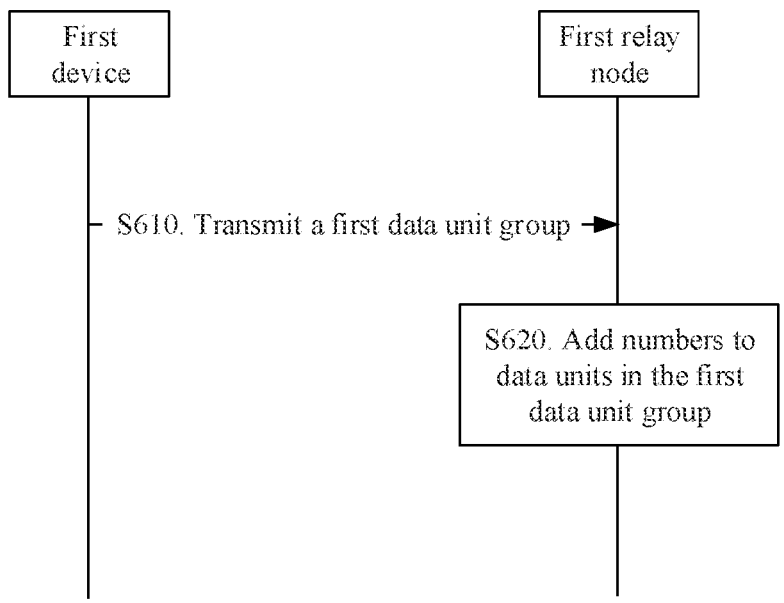
FIG. 7 is a schematic interaction flowchart of a data unit processing method according to another embodiment of this application.

FIG. 7 is a schematic flowchart of a communication method 600 according to an embodiment of this application. The communication method 600 may be applied to an uplink transmission scenario or a downlink transmission scenario in the scenario shown in FIG. 2, or certainly may be applied to another communication scenario. This is not limited in this application. Using uplink transmission as an example, the communication method 600 includes the following steps.

S610. A first relay node receives a first data unit group transmitted by the first device.

For example, in an uplink transmission scenario, the first relay node receives a first data unit group transmitted by a terminal device.

S620. The first relay node adds numbers to data units in the first data unit group.

Optionally, in an embodiment of this application, that the first relay node adds numbers to data units in the first data unit group includes:

the first relay node adds the numbers to the data units in the first data unit group based on receiving order.

Optionally, in an embodiment of this application, before the first relay node adds numbers to data units in the first data unit group, the method further includes:

the first relay node orders the data units in the first data unit group.

In this embodiment of this application, in the technical solution of this embodiment of this application, the first relay node can add numbers to data units, thereby avoiding a packet loss problem generated because a data unit is beyond a receive window of a receive end, and improving accuracy of data transmission and efficiency of data transmission.

It should be noted that the first relay node is a relay node that directly communicates with the first device. For example, in an uplink transmission scenario, the first relay node is a relay node that may directly communicate with the terminal device.

Optionally, in an embodiment, the first relay node may have an ordering function and a numbering function; or the first relay node may have a numbering function; or the first relay node has an ordering function. This is not limited in this application.

Figure 8:
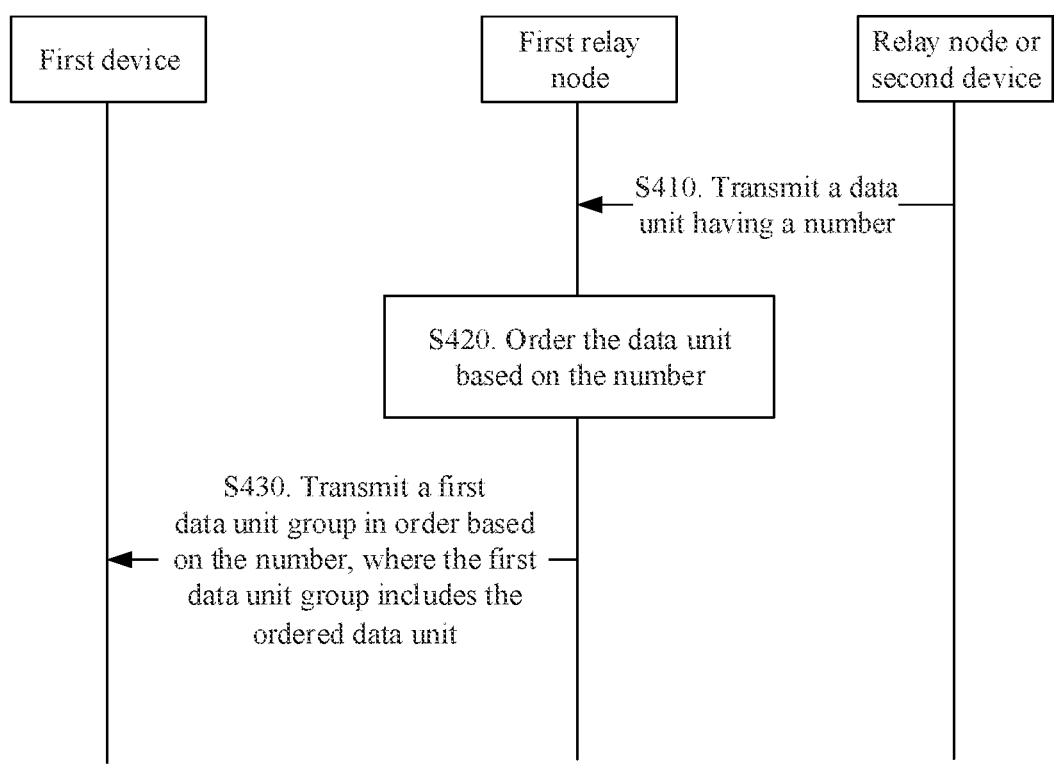
FIG. 8 is a schematic interaction flowchart of a data unit processing method according to another embodiment of this application.

FIG. 8 is a schematic flowchart of a communication method 400 according to an embodiment of this application. The communication method 400 may be applied to an uplink transmission scenario or a downlink transmission scenario in the scenario shown in FIG. 2, or certainly may be applied to another communication scenario. This is not limited in this application. Using downlink transmission as an example, the communication method 400 includes the following steps.

S410. A first relay node receives a data unit having a number and transmitted by at least one relay node or a second device.

S420. The first relay node orders the data unit based on the number.

For example, in a downlink transmission scenario, a base station communicates with a terminal device by using a third relay node, a second relay node, and the first relay node. The third relay node directly communicates with the base station. The third relay node receives a first data unit group transmitted by the base station and adds numbers to the first data unit group in receiving order. The third relay node transmits the first data unit group having the numbers to the second relay node. After the second relay node receives the first data unit group having the numbers, the second relay node may order the first data unit group; or the second relay node may not order the first data unit group, but directly transmits the first data unit group having the numbers to the first relay node; and the first relay node receives data units having numbers, and orders the data units based on the numbers.

S430. The first relay node transmits a first data unit group to the first device in order based on the number, where the first data unit group includes the ordered data unit.

In this embodiment of this application, in the technical solution of this embodiment of this application, the first relay node can add numbers to data units, thereby avoiding a packet loss problem generated because a data unit is beyond a receive window of a receive end, and improving accuracy of data transmission and efficiency of data transmission.

For example, in a downlink transmission scenario, the base station communicates with the terminal device by using the third relay node, the second relay node, and the first relay node. The first relay node receives a data unit having a number and transmitted by the second relay node. The first relay node orders the data unit based on the number, and transmits a first data unit group to the terminal device in order based on the number, where the first data unit group includes the ordered data unit.

Figure 9:
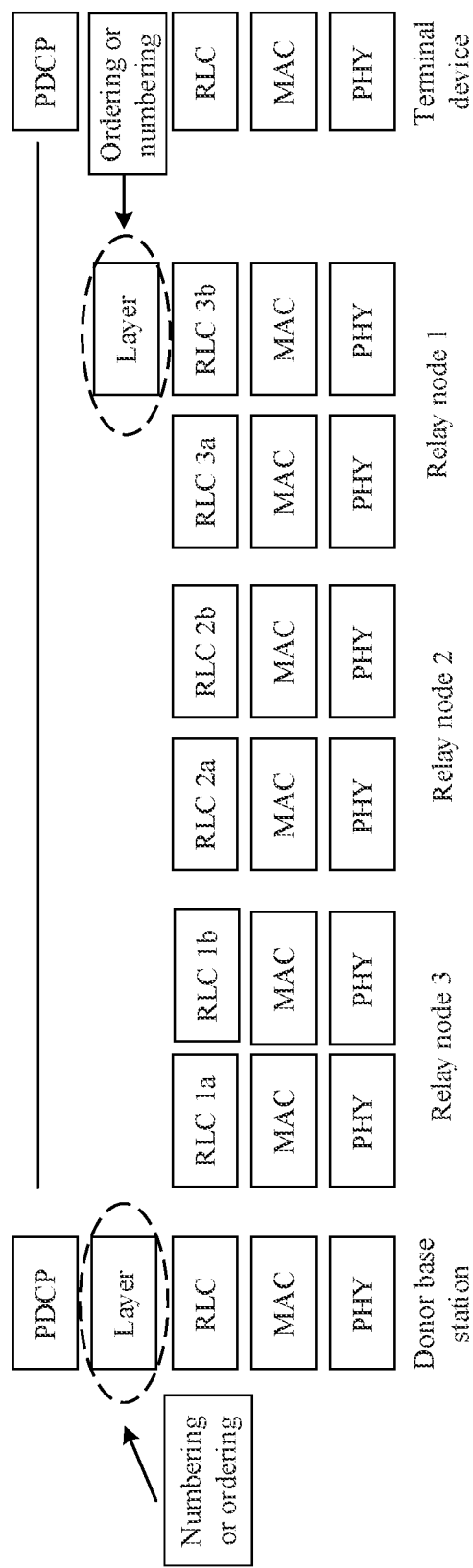
FIG. 9 is a schematic diagram of a data unit processing method according to another embodiment of this application.

In an embodiment of this application, as shown in FIG. 9, FIG. 9 is a schematic diagram of a data processing method according to an embodiment of this application.

A first device communicates with a second device by using at least one relay node. For example, the first device may communicate with the second device by using a first relay node, a second relay node, and a third relay node. The first relay node is a relay node connected to the first device. In this embodiment of this application, the first relay node has numbering and ordering functions.

For example, a terminal device transmits data units whose sequence numbers are 1 to 5 to the first relay node, and order of the data units received by the first relay node is: data unit numbered 2, data unit numbered 1, data unit numbered 3, data unit numbered 4, and data unit numbered 5. The first relay node may number the received data units. The first relay node may perform numbering based on order of receiving the data units. For example, the first relay node adds ① to the data unit whose sequence number is 2, adds ② to the data unit whose sequence number is 1, adds ③ to the data unit whose sequence number is 3, adds ④ to the data unit whose sequence number is 4, and adds ⑤ to the data unit whose sequence number is 5. The first relay node may add the numbers of the data units to headers of the data units.

It should be understood that a sequence number of a data unit is a number that a PDCP layer can recognize, but a relay node does not have a PDCP layer and therefore cannot recognize the number. The first relay node adds numbers ①, ②, ③, ④, and ⑤ to the data units based on the receiving order. The numbers added by the first relay node are numbers that the relay node can recognize.

As shown in FIG. 9, the first relay node transmits a data unit having a number to the second relay node. The second relay node may not perform ordering based on the added number of the data unit. The second relay node transmits the data unit to the third relay node. The third relay node transmits the data unit to the second device. After performing ordering based on the added number, the second device delivers the data unit to a PDCP layer of the second device, thereby ensuring that the data unit received by the PDCP layer of the second device is not beyond a receive window. The PDCP layer of the second device then performs ordering based on a number of the PDCP layer, thereby avoiding a packet loss phenomenon generated on the second device because a data unit is beyond the receive window.

As shown in FIG. 9, an adaptation layer of the first relay node may have ordering and numbering functions; or an adaptation layer of the first relay node may have an ordering function; or an adaptation layer of the first relay node may have a numbering function. This is not limited in this application.

Optionally, an adaptation layer of the second relay node may have an ordering function, or an RLC entity of the second relay node may have an ordering function. This is not limited in this application.

Optionally, in this embodiment of this application, the adaptation layer may be located above the RLC entity; or the adaptation layer may be located above a MAC entity.

Figure 10:
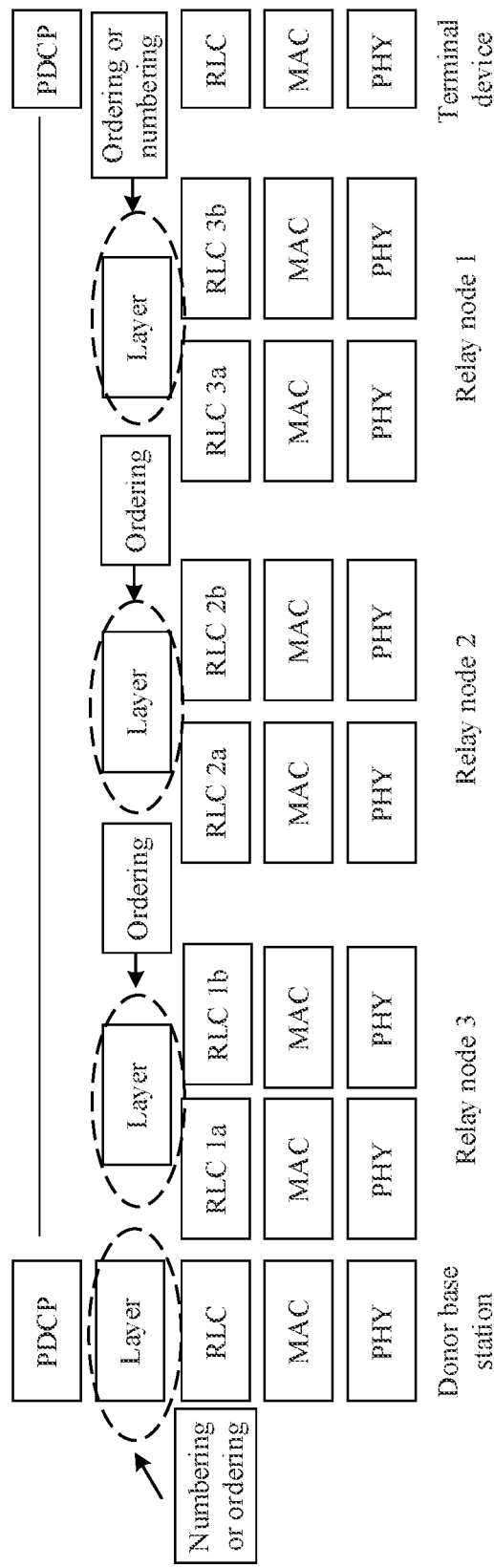
FIG. 10 is a schematic diagram of a data unit processing method according to still another embodiment of this application.

FIG. 10 is a schematic diagram of a data processing method according to another embodiment of this application. As shown in FIG. 10, a first device communicates with a second device by using at least one relay node. For example, the first device may communicate with the second device by using a first relay node, a second relay node, and a third relay node. The first relay node is a relay node connected to the first device. In this embodiment of this application, the first relay node has a numbering function.

The first relay node transmits a data unit having a number to the second relay node. The second relay node may order the data unit based on the number, and then the second relay node may transmit the data unit having the number to the third relay node. The third relay node may order the data unit based on the number. The third relay node transmits the ordered data unit to the second device, thereby ensuring that the data unit received by the second device is not beyond a receive window, and avoiding a packet loss phenomenon generated on the second device because a data unit is beyond the receive window.

In an embodiment of this application, the second relay node receives a data unit transmitted by a relay node that is connected to the second relay node, where the data unit has a number; and the second relay node orders the data unit having the number.

Figure 11:
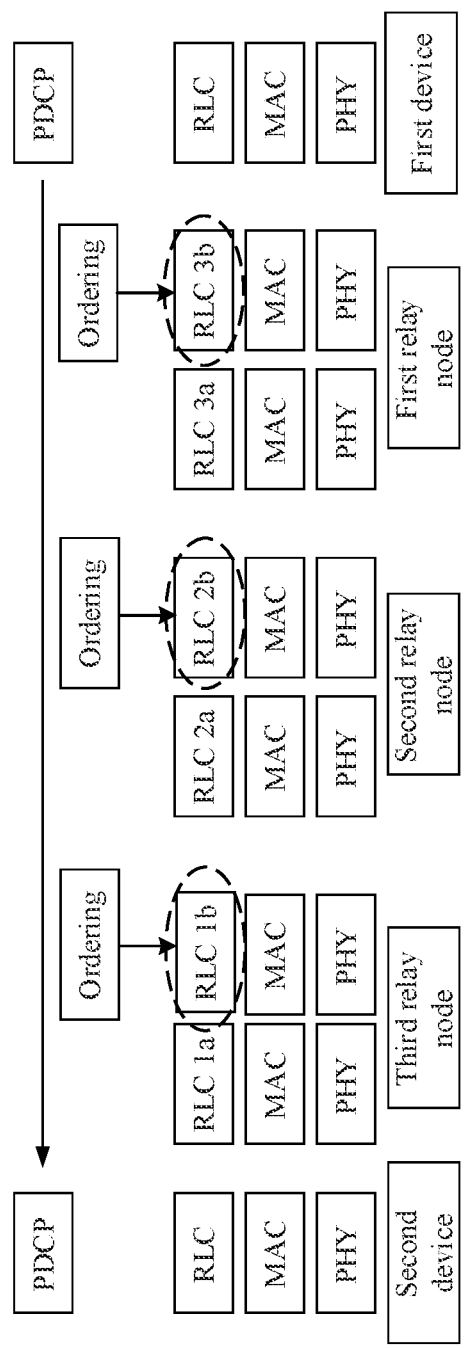
FIG. 11 is a schematic diagram of a data unit processing method according to still another embodiment of this application.

FIG. 11 is a schematic diagram of a processing method according to another embodiment of this application. In an embodiment, a first device is a terminal device. In an uplink transmission scenario, as shown in the figure, an RLC layer of a relay node has an ordering function. FIG. 11 is a schematic diagram of a data processing method according to another embodiment of this application. In FIG. 11, a first device may be a terminal device, and a second device may be a base station.

According to the data processing method shown in FIG. 11, an RLC layer of a relay node has an ordering function. A first relay node transmits a data unit having a number to a second relay node; the second relay node performs ordering based on the number of the data unit, and transmits the ordered data unit to a third relay node; and the third relay node orders the data unit based on the number of the data unit, and transmits the ordered data unit to the base station.

It should be understood that a sequence number of a data unit is a number that a PDCP layer can recognize, but a relay node does not have a PDCP layer and therefore cannot recognize a number of the PDCP layer. A receiving RLC entity of the first relay node orders the received data unit based on a number of an RLC layer, performs numbering at the RLC layer based on receiving order, and transmits the data unit to the second relay node. A receiving RLC entity of the third relay node orders the received data unit based on a number of an RLC layer, performs numbering at the RLC layer based on receiving order, and transmits the data unit to the second device. An RLC layer of the second device delivers the data unit to a PDCP layer after ordering the data unit based on a number of the RLC layer.

Figure 12:
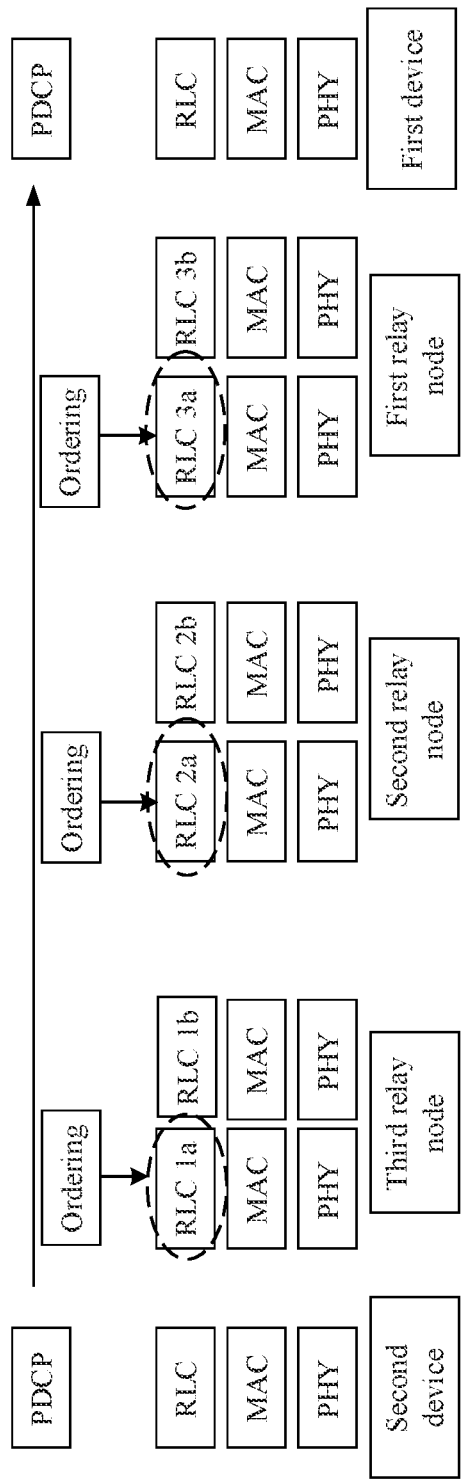
FIG. 12 is a schematic diagram of a data unit processing method according to still another embodiment of this application.

Optionally, in an embodiment, a first device is a terminal device. In a downlink transmission scenario, as shown in the figure, an RLC layer of a relay node has an ordering function. FIG. 12 is a schematic diagram of a data processing method according to another embodiment of this application. In FIG. 12, a first device may be a terminal device, and a second device may be a base station.

According to the data processing method shown in FIG. 12, an RLC layer of a relay node has an ordering function. A third relay node receives a data unit transmitted by the base station, and numbers and orders the data unit; the third relay node transmits the ordered data unit having a number to a second relay node; the second relay node performs ordering based on the number of the data unit, and transmits the ordered data unit to a first relay node; and the first relay node orders the data unit based on the number of the data unit, and transmits the ordered data unit to the terminal device.

It should be understood that a sequence number of a data unit is a number that a PDCP layer can recognize, but a relay node does not have a PDCP layer and therefore cannot recognize a number of the PDCP layer. A receiving RLC entity of the third relay node orders the received data unit based on a number of an RLC layer, performs numbering at the RLC layer based on receiving order, and transmits the data unit to the second relay node. A receiving RLC entity of the first relay node orders the received data unit based on a number of an RLC layer, performs numbering at the RLC layer based on receiving order, and transmits the data unit to the first device. An RLC layer of the first device performs ordering based on a number of the RLC layer or delivers the data unit to a PDCP layer based on receiving order.

In the technical solution of this embodiment of this application, the second relay node can order data units that have numbers, thereby avoiding a packet loss problem generated because a data unit is beyond a receive window of a receive end, and improving accuracy of data transmission and efficiency of data transmission.

Figure 13:
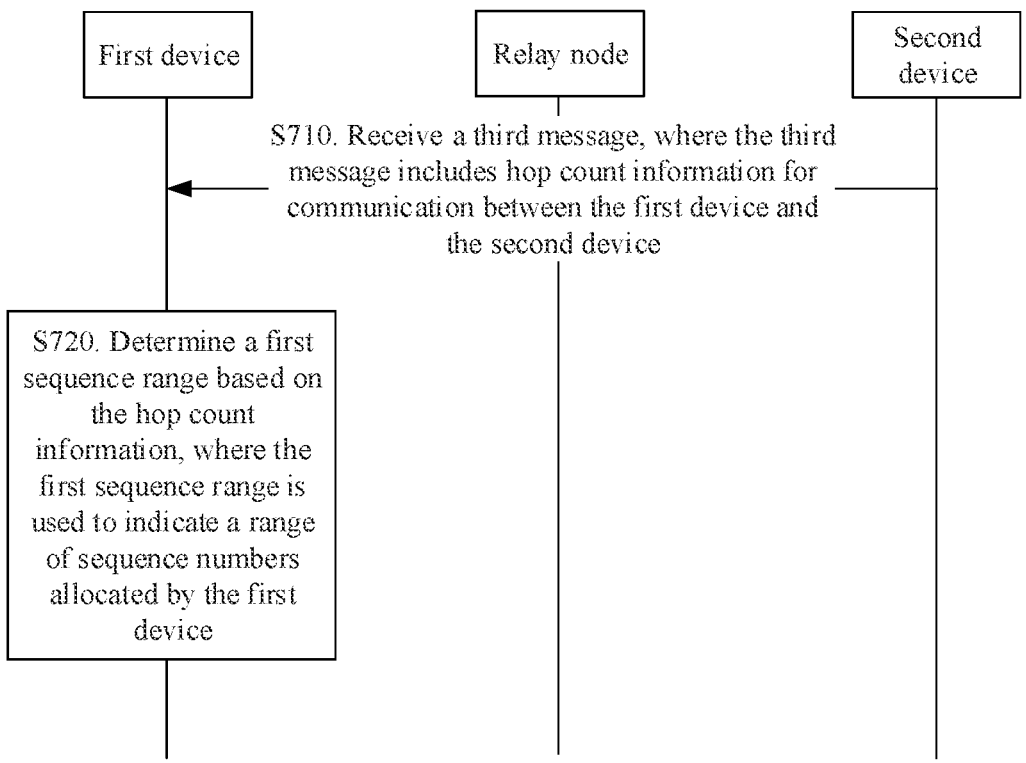
FIG. 13 is a schematic interaction flowchart of a data unit processing method according to still another embodiment of this application.

FIG. 13 is a schematic flowchart of a communication method 700 according to an embodiment of this application. The communication method 700 may be applied to an uplink transmission scenario in the scenario shown in FIG. 2, or certainly may be applied to another communication scenario. This is not limited in this application. The communication method 700 includes the following steps.

S710. The first device receives a third message, where the third message includes hop count information for communication between the first device and the second device.

For example, a terminal device receives a third message, where the third message includes hop count information. If the terminal device communicates with a donor base station by using one relay node, the hop count information is two hops; or if the terminal device communicates with a donor base station by using two relay nodes, the hop count information is three hops.

Optionally, the third message may be a broadcast message; or the third message may be a message transmitted by using dedicated signaling.

Optionally, the third message may be a message transmitted by the donor base station to the terminal device and forwarded by a relay node; or the third message may be a message transmitted by a relay node to the terminal device.

S720. The first device determines a first sequence range based on the third message, where the first sequence range is used to indicate a range of sequence numbers allocated by the first device or used to indicate a maximum quantity of data units that are allowed to be transmitted.

For example, the terminal device determines the first sequence range based on the hop count information included in the third message. The first sequence range may be a transmit window of the terminal device. The terminal device may transmit a data unit included in the first sequence range. The first sequence range is less than or equal to a quantity of allocated sequence numbers, and the quantity of allocated sequence numbers is a sequence number space divided by a hop count and then divided by 2. The sequence number space (SN space) is a total quantity of sequence numbers. For example, if a sequence number is 12 bits, the sequence number space is $2^{12}$.

Figure 15:
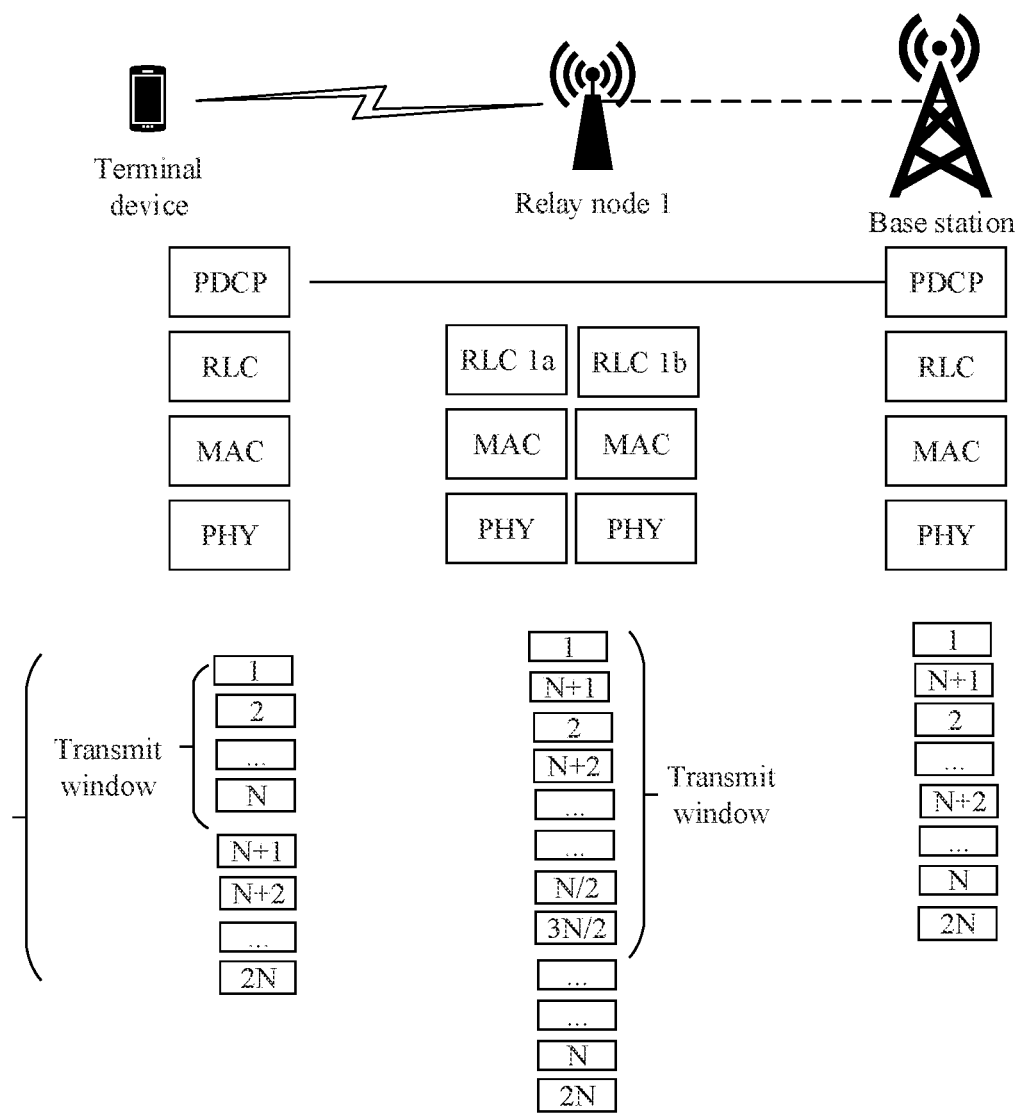
FIG. 15 is a schematic diagram of a data unit processing method according to still another embodiment of this application.

For example, FIG. 15 is a schematic diagram of a data processing method according to an embodiment of this application. In FIG. 15, two hops are used as an example for description.

A donor base station transmits a third message to a terminal device, where the third message may be a broadcast message or a dedicated message, notifying a hop count from the terminal device to the donor base station. The terminal device controls, based on a hop count X to the donor base station, a quantity of allocated SNs not to exceed a sequence number space (SN space) divided by the hop count (X) and then divided by 2. At each hop for carried data units, a quantity of data units simultaneously transmitted over an air interface also needs to be controlled not to exceed SN space/X/2.

Using two hops as an example, a length of a receive window of the donor base station is 2N. It should be understood that the length of the receive window is SN space/2, that is, the terminal device at a transmit end controls a quantity of SNs allocated to data units not to exceed 2N/2=N. As shown in FIG. 15, it can be ensured that a data unit received by PDCP of the donor base station at a receive end is not beyond the receive window, thereby avoiding a packet loss phenomenon generated on the donor base station because a data unit is beyond the receive window.

In a possible implementation, the quantity of allocated SNs is controlled not to exceed sequence number space (SN space)/$2^{loop\ count(X)}$/2. It should be noted that in the description of the foregoing embodiment, in an uplink transmission scenario, the first device may be a terminal device, and the second device may be a donor base station. In a downlink transmission scenario, the first device may be a donor base station, and the second device may be a terminal device. This is not limited in this application.

In the technical solution of this embodiment of this application, a maximum quantity of data units that a transmit end is allowed to transmit is controlled, thereby avoiding a packet loss problem generated because a data unit is beyond a receive window of a receive end, and improving accuracy of data transmission and efficiency of data transmission.

Figure 14:
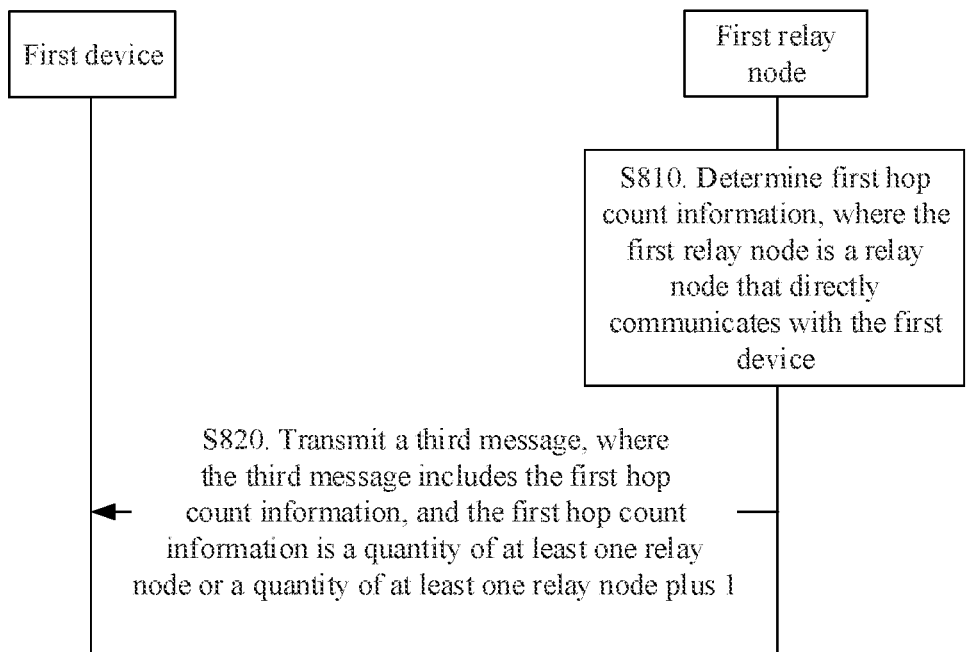
FIG. 14 is a schematic interaction flowchart of a data unit processing method according to still another embodiment of this application.

FIG. 14 is a schematic flowchart of a communication method 800 according to an embodiment of this application. The communication method 800 may be applied to an uplink transmission scenario in the scenario shown in FIG. 2, or certainly may be applied to another communication scenario. This is not limited in this application. The communication method 800 includes the following steps.

S810. A first relay node determines first hop count information, where the first relay node is a relay node that directly communicates with the first device.

For example, the first device may be a terminal device, and a second device may be a base station.

For example, the terminal device receives a third message, where the third message includes hop count information. If the terminal device communicates with a donor base station by using one relay node, the hop count information is two hops; or if the terminal device communicates with a donor base station by using two relay nodes, the hop count information is three hops.

Alternatively, if the terminal device communicates with a donor base station by using one relay node, the hop count information is one hop, or if the terminal device communicates with a donor base station by using two relay nodes, the hop count information is two hops.

Optionally, that a first relay node determines first hop count information includes:

the first relay node obtains a quantity of the at least one relay node by adding 1 to hop count information broadcast by a previous-hop relay node of the first relay node.

For example, the first relay node is connected to a second relay node, and the hop count information broadcast by the second relay node and received by the first relay node is that the second relay node is two hops. In this case, the first relay node adds 1 to the hop count information broadcast by the second relay node, that is, the first relay node is three hops.

Optionally, the third message may be a broadcast message; or the third message may be a message transmitted by using dedicated signaling.

Optionally, the third message may be a message transmitted by the donor base station to the terminal device and forwarded by a relay node; or the third message may be a message transmitted by a relay node to the terminal device.

S820. The first relay node transmits a third message to the first device, where the third message includes the first hop count information, and the first hop count information is the quantity of the at least one relay node or the quantity of the at least one relay node plus 1.

Optionally, that the first relay node determines the first hop count information includes:

the first relay node obtains the first hop count information by adding 1 to second hop count information broadcast by a previous-hop relay node of the first relay node.

For example, the terminal device determines a first sequence range based on the first hop count information included in the third message. The first sequence range may be a transmit window of the terminal device. The terminal device may transmit a data unit included in the first sequence range.

The first sequence range is less than or equal to a quantity of allocated sequence numbers, and the quantity of allocated sequence numbers is a sequence number space divided by a hop count and then divided by 2. The sequence number space (SN space) is a total quantity of sequence numbers. For example, if a sequence number is 12 bits, the sequence number space is $2^{12}$.

For example, FIG. 15 is a schematic diagram of a data processing method according to an embodiment of this application. In FIG. 15, two hops are used as an example for description.

A relay transmits a third message to a terminal device, where the third message may be a broadcast message or a dedicated message, notifying a hop count from the terminal device to a donor base station. The terminal device controls, based on a hop count X to the donor base station, a quantity of allocated SNs not to exceed SN space/X/2. At each hop for carried data units, a quantity of data units simultaneously transmitted over an air interface also needs to be controlled not to exceed SN space/X/2.

Using two hops as an example, a length of a receive window of the donor base station is 2N. It should be understood that the length of the receive window is SN space/2, that is, the terminal device at a transmit end controls a quantity of SNs allocated to data units not to exceed 2N/2=N. As shown in FIG. 13, it can be ensured that a data unit received by PDCP of the donor base station at a receive end is not beyond the receive window, thereby avoiding a packet loss phenomenon generated on the donor base station because a data unit is beyond the receive window.

It should be noted that in the description of the foregoing embodiment, in an uplink transmission scenario, the first device may be a terminal device, and the second device may be a donor base station. In a downlink transmission scenario, the first device may be a donor base station, and the second device may be a terminal device. This is not limited in this application.

In the technical solution of this embodiment of this application, a maximum quantity of data units that a transmit end is allowed to transmit is controlled, thereby avoiding a packet loss problem generated because a data unit is beyond a receive window of a receive end, and improving accuracy of data transmission and efficiency of data transmission.

Figure 16:
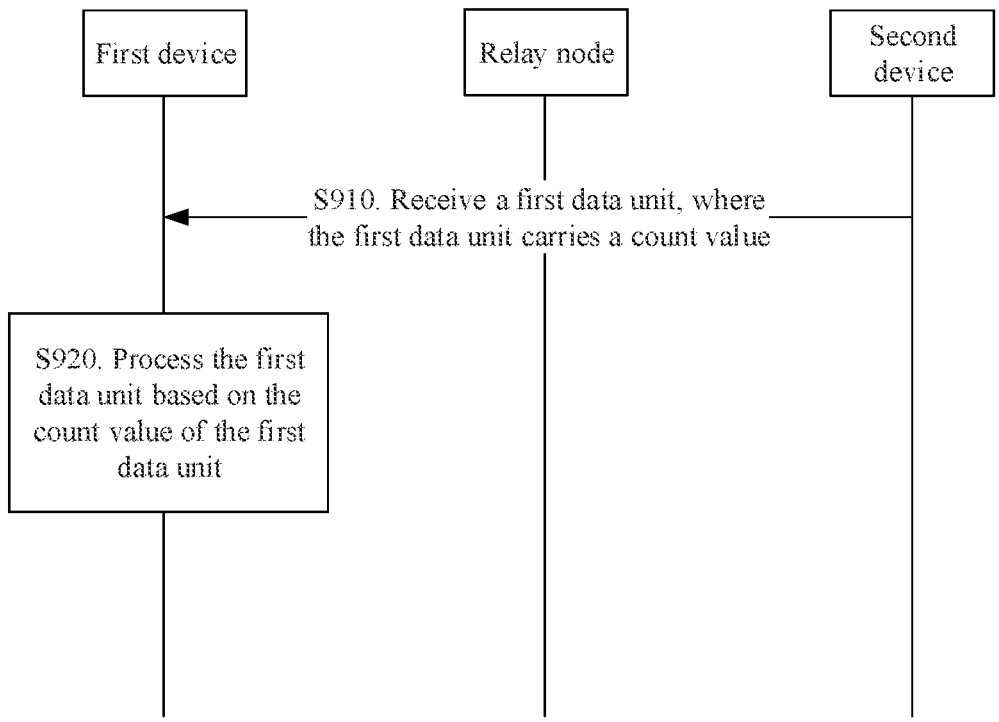
FIG. 16 is a schematic interaction flowchart of a data unit processing method according to still another embodiment of this application.

FIG. 16 is a schematic flowchart of a data processing method 900 according to an embodiment of this application. The communication method 900 may be applied to a downlink transmission scenario in the scenario shown in FIG. 2, or certainly may be applied to another communication scenario. This is not limited in this application. The communication method 900 includes the following steps.

S910. A first device receives, by using at least one relay node, a first data unit transmitted by the second device, where the first data unit carries a count value. The first device communicates with the second device by using the at least one relay node. The at least one relay node does not have a packet data convergence protocol PDCP entity. For example, a terminal device receives a first data unit transmitted by a donor base station, where the first data unit carries a count value. As shown in FIG. 3, each data unit has a count value and is transmitted over an air interface of a transmit end (transmitting device) in ascending order of count values of data units.

It should be noted that the first device in this embodiment of this application may be a terminal device. A data unit transmitted over an air interface carries a count value, and a transmit end (for example, the donor base station) still has a transmit window, that is, transmits a data packet whose count is in a range, but a receive end (for example, the terminal device) does not have a maximum edge of a receive window.

Optionally, in an embodiment of this application, the first data unit is in a first sequence range. To be specific, the first data unit is in the transmit window of the transmit end.

Optionally, in an embodiment of this application, the first sequence range is used to indicate a range of count values that the second device is allowed to allocate or a range of count values that the second device is allowed to allocate when transmitting the first data unit. To be specific, the second device needs to transmit the first data unit in a range allowed by the transmit window. The first data unit transmitted by the second device needs to be in the range allowed by the transmit window during transmission.

Optionally, in an embodiment of this application, the first sequence range is half of a sequence number space or less than half of a sequence number space. To be specific, a maximum quantity of data units allowed to be transmitted in the transmit window that exists at the transmit end is half of the sequence number space. The donor base station may transmit data units in the first sequence range.

S920. The first device processes the first data unit based on the count value carried in the first data unit.

For example, the terminal device processes the first data unit based on the count value of the first data unit.

Optionally, in an embodiment, if the count value of the first data unit is greater than a count value next to a count value of a last data unit currently already delivered, the first data unit is stored.

For example, if the count value of the last data unit already delivered is 10, the count value next to the count value of the last data unit already delivered is 11. If the count value of the first data unit is 12, the terminal device stores the first data unit.

It should be understood that when the count value of the first data unit is greater than the count value next to the count value of the last data unit currently already delivered, it indicates that the terminal device has not stored the first data unit. The terminal device first stores the first data unit and delivers the data units to an upper layer of a PDCP entity in order.

If the count value of the first data unit is equal to the count value next to the count value of the last data unit currently already delivered, the first data unit is delivered to the upper layer of the packet data convergence protocol PDCP entity.

For example, if the count value of the last data unit already delivered is 10, the count value next to the count value of the last data unit already delivered is 11. If the count value of the first data unit is 11, the terminal device delivers the first data unit to the upper layer of the PDCP entity.

If the count value of the first data unit is less than the count value next to the count value of the last data unit currently already delivered, the first data unit is discarded.

For example, if the count value of the last data unit already delivered is 10, the count value next to the count value of the last data unit already delivered is 11. If the count value of the first data unit is 9, the first data unit is discarded.

It should be understood that when the count value of the first data unit is less than the count value next to the count value of the last data unit currently already delivered, it indicates that the terminal device has stored the first data unit. In this case, when receiving the data unit again, the terminal device discards the data unit.

In an embodiment of this application, in an uplink transmission scenario, the second device transmits the first data unit to the first device by using the at least one relay node, where the first data unit carries the count value. The first device communicates with the second device by using the at least one relay node, and the at least one relay node does not have the packet data convergence protocol PDCP entity. The first data unit belongs to the first sequence range. The first sequence range is used to indicate the range of count values that the second device is allowed to allocate or the range of count values that the second device is allowed to allocate when transmitting the first data unit.

Optionally, a size of the first sequence range is half of the sequence number space or less than half of the sequence number space.

It should be noted that in the description of the foregoing embodiment, in a downlink transmission scenario, the first device may be a terminal device, and the second device may be a donor base station. In an uplink transmission scenario, the first device may be a donor base station, and the second device may be a terminal device. This is not limited in this application.

In the technical solution of this embodiment of this application, a maximum edge of a transmit window exists at a transmit end, a maximum edge of a receive window does not exist at a receive end, and a data unit carrying a count value is transmitted, so that the data unit is processed, thereby avoiding a packet loss problem generated because a data unit is beyond the receive window of the receive end, and improving accuracy of data transmission and efficiency of data transmission.

It should be understood that sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

The data processing methods according to the embodiments of this application are described in detail above. In this application, the first device determines the second sequence range based on the first information. Specifically, the first device receives the first information by using the at least one relay node, where the first information is used to indicate the data unit that the second device has received and/or has not received in the first data unit group, thereby improving accuracy of data transmission and efficiency of data transmission. It should be understood that a data processing device in the embodiments of this application may perform each method in the foregoing embodiments of this application. To be specific, for a specific working process of each product, refer to the corresponding process in the foregoing method embodiments.

The following describes embodiments of communications devices in this application in detail with reference to FIG. 17 to FIG. 20. It should be understood that the description of the method embodiments corresponds to the description of the embodiments of the communications devices. Therefore, for parts that are not described in detail, refer to the foregoing method embodiments.

Figure 17:
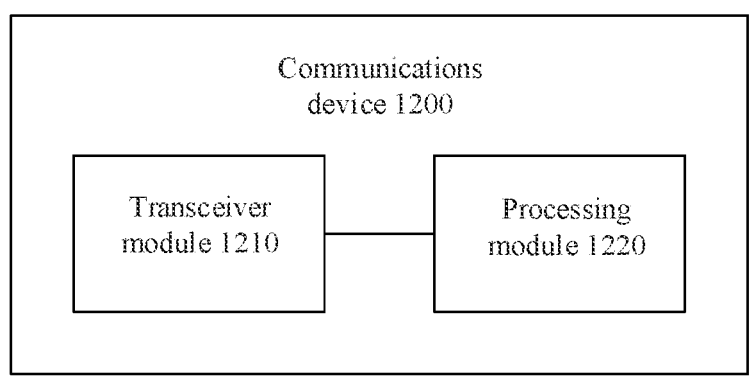
FIG. 17 is a schematic block diagram of a communications device 1200 according to an embodiment of this application.

FIG. 17 is a schematic block diagram of a communications device 1200 for data processing according to an embodiment of this application. In an uplink transmission scenario, the communications device 1200 may correspond to the first device in each method embodiment, and may have any function of the first device in the method.

As shown in FIG. 17, the communications device 1200 may include a transceiver module 1210 and a processing module 1220.

The transceiver module 1210 and the processing module 1220 communicate with each other by using an internal connection path, for transfer a control and/or data signal. In a possible design, the transceiver module 1210 and the processing module 1220 may be implemented by using chips, to implement corresponding functions of a terminal device in an embodiment of this application.

In an embodiment of this application, the communications device 1200 communicates with a second device by using at least one relay node, and the at least one relay node does not have a packet data convergence protocol PDCP entity. In an uplink transmission scenario, the communications device 1200 may be a terminal device, and the second device may be a donor base station. The communications device 1200 includes a transceiver module 1210 and a processing module 1220.

The transceiver module 1210 is configured to transmit a first data unit group, where the first data unit group is in a first sequence range.

The transceiver module 1210 is further configured to receive first information by using the at least one relay node, where the first information is used to indicate a data unit that the second device has received and/or has not received in the first data unit group.

The processing module 1220 is configured to determine a second sequence range based on the first information.

It should be understood that the first sequence range may be a transmit window of a transmit end. The terminal device may transmit a data unit in the first sequence range.

Optionally, the processing module 1220 is further configured to:

if the first information includes information about successful reception of N consecutive data units starting from the first data unit in the first sequence range, obtain the second sequence range by shifting the first sequence range by N sequences, where N is a positive integer.

Optionally, the transceiver module 1210 is further configured to:

receive a first message transmitted by the second device and forwarded by the at least one relay node, where the first message includes the first information.

Optionally, the first message is a status report of a PDCP entity; or the first message is a status report of a radio link control RLC entity.

Optionally, the first message is a periodically transmitted message.

Optionally, the transceiver module 1210 is further configured to:

transmit a query request to the second device.

Optionally, the transceiver module 1210 is further configured to:

receive a second message obtained by the at least one relay node based on a first message transmitted by the second device, where the second message includes the first information.

Optionally, the second message is determined by the at least one relay node based on the first message and a mapping relationship between numbers of data units transmitted and received that is maintained by the at least one relay node.

Optionally, the second message is a status report of an RLC entity.

It should be understood that in the description of the foregoing embodiment, in an uplink transmission scenario, the first device may be a terminal device, and the second device may be a donor base station. In a downlink transmission scenario, the first device may be a donor base station, and the second device may be a terminal device. This is not limited in this application.

In an embodiment of this application, the communications device 1200 communicates with a second device by using at least one relay node, and the at least one relay node does not have a packet data convergence protocol PDCP entity. In an uplink transmission scenario, the communications device 1200 may be a terminal device, and the second device may be a donor base station. The communications device 1200 includes a transceiver module 1210 and a processing module 1220.

The transceiver module 1210 is configured to receive a third message, where the third message includes hop count information for communication between the first device and the second device.

The processing module 1220 is configured to determine a first sequence range based on the hop count information, where the first sequence range is used to indicate a range of sequence numbers allocated by the first device or used to indicate a maximum quantity of data units that are allowed to be transmitted.

For example, the terminal device receives a third message, where the third message includes hop count information. If the terminal device communicates with the donor base station by using one relay node, the hop count information is two hops; or if the terminal device communicates with the donor base station by using two relay nodes, the hop count information is three hops.

Optionally, the first sequence range is less than or equal to a quantity of allocated sequence numbers, and the quantity of allocated sequence numbers is a sequence number space divided by a hop count and then divided by 2.

Optionally, the third message is a broadcast message.

Optionally, the third message is a message transmitted by using dedicated signaling.

Optionally, the third message is transmitted by the second device.

For example, the third message is a message transmitted by the donor base station.

Optionally, the third message is transmitted by the at least one relay node.

It should be understood that in the description of the foregoing embodiment, in a downlink transmission scenario, the first device may be a terminal device, and the second device may be a donor base station. In an uplink transmission scenario, the first device may be a donor base station, and the second device may be a terminal device. This is not limited in this application.

In an embodiment of this application, the communications device 1200 communicates with a second device by using at least one relay node, and the at least one relay node does not have a packet data convergence protocol PDCP entity. In an uplink transmission scenario, the communications device 1200 may be a terminal device, and the second device may be a donor base station. The communications device 1200 includes a transceiver module 1210 and a processing module 1220.

The transceiver module 1210 is configured to receive, by using the at least one relay node, a first data unit transmitted by the second device, where the first data unit carries a count value.

The processing module 1220 is configured to process the first data unit based on the count value carried in the first data unit.

For example, the terminal device receives, by using the at least one relay node, a first data unit transmitted by the donor base station, where the first data unit carries a count value; and the terminal device processes the first data unit based on the count value carried in the first data unit.

Optionally, the processing unit 1220 is further configured to:

if the count value of the first data unit is greater than a count value next to a count value of a last data unit currently already delivered, store the first data unit; or if the count value of the first data unit is equal to a count value next to a count value of a last data unit currently already delivered, deliver the first data unit to an upper layer of a packet data convergence protocol PDCP entity; or if the count value of the first data unit is less than a count value next to a count value of a last data unit currently already delivered, discard the first data unit.

Optionally, the processing unit 1220 is further configured to:

store the first data unit, and deliver the first data unit to the upper layer of the PDCP entity in order based on the count value of the first data unit.

For example, if the count value of the last data unit already delivered is 10, the count value next to the count value of the last data unit already delivered is 11. If the count value of the first data unit is 12, the terminal device stores the first data unit.

It should be understood that when the count value of the first data unit is greater than the count value next to the count value of the last data unit currently already delivered, it indicates that the terminal device has not stored the first data unit. The terminal device first stores the first data unit and delivers the data units to the upper layer of the PDCP entity in order.

If the count value of the first data unit is equal to the count value next to the count value of the last data unit currently already delivered, the first data unit is delivered to the upper layer of the packet data convergence protocol PDCP entity.

For example, if the count value of the last data unit already delivered is 10, the count value next to the count value of the last data unit already delivered is 11. If the count value of the first data unit is 11, the terminal device delivers the first data unit to the upper layer of the PDCP entity.

If the count value of the first data unit is less than the count value next to the count value of the last data unit currently already delivered, the first data unit is discarded.

For example, if the count value of the last data unit already delivered is 10, the count value next to the count value of the last data unit already delivered is 11. If the count value of the first data unit is 9, the first data unit is discarded.

It should be understood that when the count value of the first data unit is less than the count value next to the count value of the last data unit currently already delivered, it indicates that the terminal device has stored the first data unit. In this case, when receiving the data unit again, the terminal device discards the data unit.

Optionally, the first data unit is in the first sequence range.

Optionally, the first sequence range indicates a range of count values that the second device is allowed to allocate.

Optionally, the first sequence range indicates a range of count values that the second device is allowed to allocate when transmitting the first data unit.

Optionally, a size of the first sequence range is half of a sequence number space or less than half of a sequence number space.

A transmission part of the second device needs to be supplemented.

It should be noted that in the description of the foregoing embodiment, in a downlink transmission scenario, the first device may be a terminal device, and the second device may be a donor base station. In an uplink transmission scenario, the first device may be a donor base station, and the second device may be a terminal device. This is not limited in this application.

Figure 18:
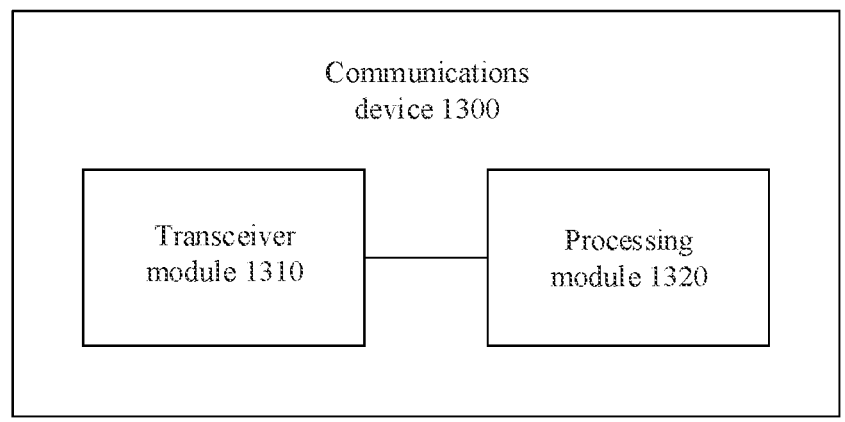
FIG. 18 is a schematic block diagram of a communications device 1300 according to an embodiment of this application.

FIG. 18 is a schematic block diagram of a communications device 1300 for data processing according to an embodiment of this application. The communications device 1300 may correspond to the relay node in each method embodiment, and may have any function of the relay node in the method.

In an embodiment of this application, a first device communicates with a second device by using at least one communications device 1300, and the at least one communications device 1300 does not have a packet data convergence protocol PDCP entity.

As shown in FIG. 13, the communications device 1300 may include a transceiver module 1310 and a processing module 1320.

The transceiver module 1310 and the processing module 13220 communicate with each other by using an internal connection path, for transfer a control and/or data signal. In a possible design, the transceiver module 13210 and the processing module 1320 may be implemented by using chips, to implement corresponding functions of a terminal device in an embodiment of this application.

As shown in FIG. 18, the communications device 1300 may include a transceiver module 1310 and a processing module 1320.

It should be noted that the communications device 1300 may be a first relay node directly connected to the first device, that is, an end relay node, or may be a second relay node connected to a first relay node, that is, an intermediate relay node.

In an embodiment of this application, when the communications device 1300 is the first relay node, the communications device 1300 is the first relay node directly connected to the first device. The communications device 1300 includes a transceiver module 1310 and a processing module 1320.

The transceiver module 1310 is configured to receive first information transmitted by a previous-hop relay node of the first relay node or the second device, where the first information is used to indicate a data unit that the second device has received and/or has not received in a first data unit group, and the first data unit group is in a first sequence range.

The processing module 1320 is configured to forward the first information by the first relay node.

In an embodiment of this application, when the communications device 1300 is the first relay node, the communications device 1300 is the first relay node directly connected to the first device. The communications device 1300 includes a transceiver module 1310 and a processing module 1320.

The transceiver module 1310 is configured to receive first information transmitted by the second device, where the first information is used to indicate a data unit that the second device has received and/or has not received in a first data unit group, and the first data unit group is in a first sequence range.

The processing module 1320 is configured to generate second information, where the second information is determined based on a mapping relationship between numbers of data units transmitted and received that is maintained by the first relay node and the first information.

The transceiver module 1310 is further configured to transmit the second information.

In an embodiment of this application, when the communications device 1300 is the first relay node, the communications device 1300 is the first relay node directly connected to the first device. The communications device 1300 includes a transceiver module 1310 and a processing module 1320.

The transceiver module 1310 is configured to receive a first data unit group transmitted by the first device.

The processing module 1320 is configured to add numbers to data units in the first data unit group based on receiving order.

Optionally, numbers are added by the communications device 1300. For example, the communications device 1300 is the first relay node, and the first relay node is a relay node that directly communicates with the terminal device.

Optionally, an adaptation layer of the communications device 1300 has an ordering function; and/or the adaptation layer of the communications device 1300 has a numbering function.

For example, an adaptation layer of the first relay node has an ordering function; and/or the adaptation layer of the first relay node has a numbering function.

Optionally, the adaptation layer is located above a radio link control RLC entity.

Optionally, the adaptation layer is located above a media access control MAC entity.

In an embodiment of this application, when the communications device 1300 is the first relay node, the communications device 1300 is the first relay node directly connected to the first device. The communications device 1300 includes a transceiver module 1310 and a processing module 1320.

The transceiver module 1310 is configured to receive a data unit having a number and transmitted by the at least one relay node.

The processing module 1320 is configured to order the data unit based on the number.

The transceiver module 1310 is further configured to transmit a first data unit group to the first device in order based on the number, where the first data unit group includes the ordered data unit.

Optionally, an adaptation layer has an ordering function; or a radio link control RLC entity has an ordering function.

Optionally, the adaptation layer is located above the radio link control RLC entity.

Optionally, the adaptation layer is located above a media access control MAC entity.

In an embodiment of this application, when the communications device 1300 is the first relay node, the communications device 1300 is the first relay node directly connected to the first device. The communications device 1300 includes a transceiver module 1310 and a processing module 1320.

The processing module 1320 is configured to determine first hop count information, where the first relay node is a relay node that directly communicates with the first device.

The transceiver module 1310 is configured to transmit a third message to the first device, where the third message includes the first hop count information, and the first hop count information is a quantity of the at least one relay node or a quantity of the at least one relay node plus 1.

Optionally, the transceiver module 1310 is configured to transmit the third message to the first device by broadcast.

Optionally, the transceiver module 1310 is configured to transmit the third message to the first device by using dedicated signaling.

Optionally, the transceiver module 1310 is configured to obtain the first hop count information by adding 1 to second hop count information broadcast by a previous-hop relay node of the first relay node.

In an embodiment of this application, when the communications device 1300 is the second relay node, the communications device 1300 is the second relay node directly connected to the relay node. The communications device 1300 includes a transceiver module 1310 and a processing module 1320.

The transceiver module 1310 is configured to receive a data unit transmitted by a relay node that is connected to the second relay node, where the data unit has a number.

The processing module 1320 is configured to order the data unit having the number.

Optionally, the number is added by the first relay node, and the first relay node is a relay node that directly communicates with the terminal device.

Optionally, an adaptation layer of the first relay node has the ordering; and/or the adaptation layer of the first relay node has a numbering function.

Optionally, an adaptation layer of the communications device 1300 has an ordering function; or a radio link control RLC entity of the communications device 1300 has an ordering function.

For example, an adaptation layer of the second relay node has the ordering function; or a radio link control RLC entity of the second relay node has the ordering function.

Optionally, the adaptation layer is located above the radio link control RLC entity.

Optionally, the adaptation layer is located above a media access control MAC entity.

In an embodiment of this application, when the communications device 1300 is the second relay node, the communications device 1300 is the second relay node directly connected to the relay node. The communications device 1300 includes a transceiver module 1310 and a processing module 1320.

The transceiver module 1310 is configured to receive a data unit transmitted by a relay node that is connected to the communications device 1300, where the data unit has a number.

The processing module 1320 is configured to order the data unit having the number.

Optionally, the number is added by an adaptation layer of the second device; or the number is added by a relay node that directly communicates with the communications device 1300.

Optionally, an adaptation layer of the communications device 1300 has an ordering function; or a radio link control RLC entity has an ordering function.

Optionally, the adaptation layer is located above the radio link control RLC entity.

Optionally, the adaptation layer is located above a media access control MAC entity.

It should be understood that in the description of the foregoing embodiment, in an uplink transmission scenario, the first device may be a terminal device, and the second device may be a donor base station. In a downlink transmission scenario, the first device may be a donor base station, and the second device may be a terminal device. This is not limited in this application.

Figure 19:
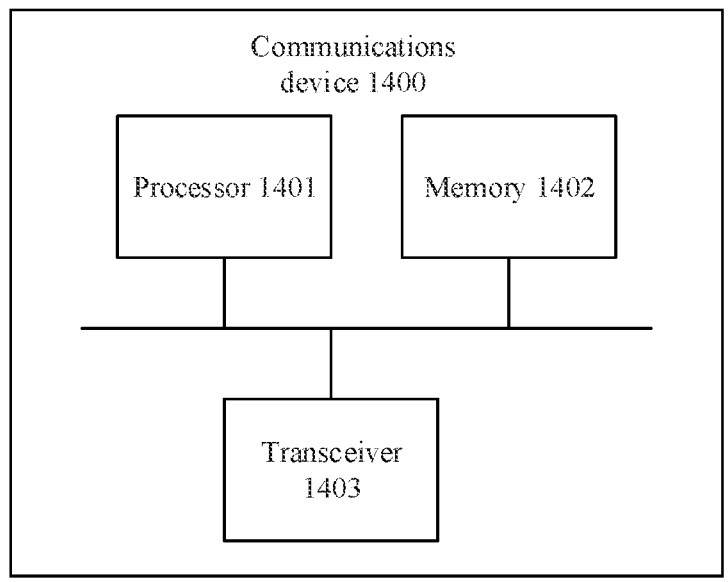
FIG. 19 is a schematic block diagram of a communications device 1400 according to an embodiment of this application.

FIG. 19 is a schematic structural diagram of a communications device 1400 according to an embodiment of this application. As shown in FIG. 19, the communications device 1400 includes one or more processors 1401, one or more memories 1402, and one or transceivers 1403. The processor 1401 is configured to control the transceiver 1403 to transmit or receive a signal. The memory 1402 is configured to store a computer program. The processor 1401 is configured to invoke and run the computer program in the memory 1402, so that the communications device performs a corresponding procedure and/or operation performed by the communications device in the embodiment of the transmission method in this application.

The processor 1401 may be configured to perform a corresponding operation and/or function of the processing module 1220 in the communications device 1200. The transceiver 1403 may be configured to perform a corresponding operation and/or function of the transceiver module 1210 in the communications device 1200. For brevity, details are not described herein.

Figure 20:
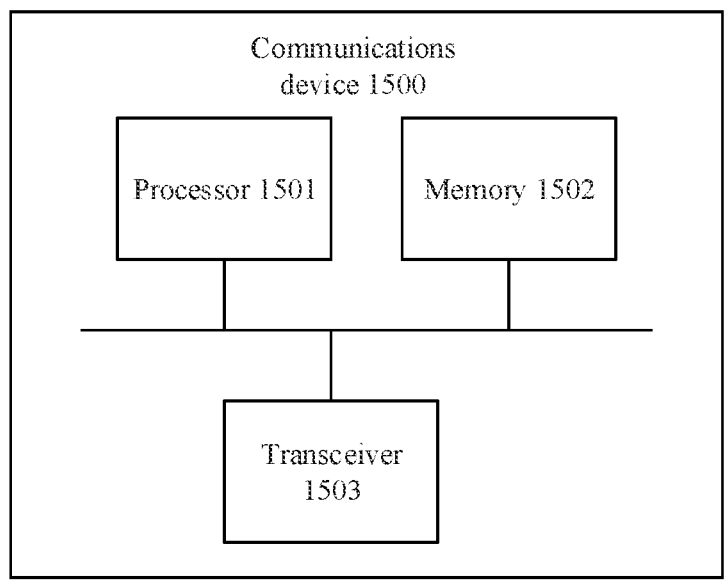
FIG. 20 is a schematic block diagram of a communications device 1500 according to an embodiment of this application.

FIG. 20 is a schematic structural diagram of a communications device 1500 according to an embodiment of this application. As shown in FIG. 20, the communications device 1500 includes one or more processors 1501, one or more memories 1502, and one or transceivers 1503. The processor 1501 is configured to control the transceiver 1503 to transmit or receive a signal. The memory 1502 is configured to store a computer program. The processor 1501 is configured to invoke and run the computer program in the memory 1502, so that the communications device performs a corresponding procedure and/or operation performed by the communications device in the embodiment of the transmission method in this application.

The processor 1501 may be configured to perform a corresponding operation and/or function of the processing module 1320 in the communications device 1300. The transceiver 1503 may be configured to perform a corresponding operation and/or function of the transceiver module 1310 in the communications device 1300. For brevity, details are not described herein.

An embodiment of this application further provides a system-on-chip, applied to a communications device. The system-on-chip includes at least one processor, at least one memory, and an interface circuit. The interface circuit is responsible for information exchange between the system-on-chip and the outside. The at least one memory, the interface circuit, and the at least one processor are interconnected by cables. The at least one memory stores an instruction, and the at least one processor executes the instruction to perform an operation performed by the communications device in the method in each of the foregoing aspects.

An embodiment of this application further provides a communications system, including a communications device and/or a network device, where the communications device is the communications device in each of the foregoing aspects.

An embodiment of this application further provides a computer program product, applied to a communications device, where the computer program product includes a series of instructions, and when the instruction is run, an operation performed by the communications device in the method in each of the foregoing aspects is performed.

Terminologies such as "component", "module", and "system" used in this application are used to indicate computer-related entities, hardware, firmware, combinations of hardware and software, software, or software being executed. For example, a component may be, but is not limited to, a process that runs on a processor, a processor, an object, an executable file, an execution thread, a program, and/or a computer. As shown in figures, both a computing device and an application that runs on the computing device may be components. One or more components may reside within a process and/or an execution thread, and a component may be located on one computer and/or distributed between two or more computers. In addition, these components may be executed from various computer-readable media that store various data structures. The components may perform communication by using a local and/or remote process based on a signal having one or more data packets (for example, data from two components interacting with another component in a local system, a distributed system, and/or a network, such as the internet interacting with other systems by using signals).

It should be understood that the manners, cases, and types in the embodiments of this application, and division of the embodiments are merely for ease of description, and should not constitute a particular limitation. Each manner, type, and case, and features of the embodiments may be combined when there is no contradiction.

It should also be understood that in each embodiment of this application, terms such as "first", "second", and "third" are merely intended to specify different objects, and do not indicate other limitations on the specified objects.

In addition, the terms "system" and "network" may be used interchangeably in this specification. The term "and/or" in this specification describes only an association relationship for describing associated objects and represents that three relationships may exist. For example, A and/or B may represent the following three cases. Only A exists, both A and B exist, and only B exists. In addition, the character "/" in this specification usually indicates an "or" relationship between the associated objects.

It should be understood that in the embodiments of this application, "B corresponding to A" indicates that B is associated with A, and B may be determined according to A. However, it should further be understood that determining B according to A does not mean that B is determined according to A only, but B may be alternatively determined according to A and/or other information.

All or some of the foregoing embodiments may be implemented through software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedures or functions according to the embodiments of the present invention are completely or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (digital video disc, DVD)), a semiconductor medium (for example, a solid-state drive (solid state disk, SSD)), or the like.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solution. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, division into the units is merely logical function division. There may be another division manner in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, function units in the embodiments of this application may be integrated into one processing unit, or each of the units may exist alone physically, or two or more units may be integrated into one unit.

When the functions are implemented in a form of a software function unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method implemented by a second relay node, wherein the second relay node does not comprise a Packet Data Convergence Protocol (PDCP) entity, and wherein the method comprises:
   receiving a plurality of data units from a first relay node coupled to the second relay node, wherein each data unit of the plurality of data units comprises a sequence number; and
   performing numbering of the plurality of data units based on an order of receiving the plurality of data units from the first relay node; and
   transmitting the plurality of data units to a second device based on the numbering of the plurality of data units, wherein the second device determines which data units are within a transmit window based on the numbering and then reorders the plurality of data units based on the sequence number of each data unit.

2. The method of claim 1, further comprising adding the sequence number to each data unit of the plurality of data units by the first relay node, wherein the first relay node directly communicates with a first device.

3. The method of claim 2, wherein an adaptation layer of the first relay node comprises a numbering function, or wherein a Radio Link Control (RLC) entity of the first relay node comprises a second ordering function.

4. The method of claim 3, wherein the adaptation layer is located above the RLC entity.

5. The method of claim 3, wherein the adaptation layer is located above a media access control (MAC) entity.

6. The method of claim 1, wherein the second device is configured to:
   perform ordering of the plurality of data units based on the numbering of the plurality of data units;
   deliver the ordered plurality of data units to a PDCP layer of the second device; and
   perform, by the PDCP layer, further ordering of the plurality of data units based on the sequence number of each data unit of the plurality of data units.

7. The method of claim 1, wherein performing numbering of the plurality of data units comprises uniquely numbering each data unit of the plurality of data units.

8. A method implemented by a second device, comprising:
   receiving a plurality of data units from a second relay node, wherein the second relay node transmits the plurality of data units based on a numbering of the plurality of data units;
   performing ordering of the plurality of data units based on the numbering;
   delivering the ordered plurality of data units to a Packet Data Convergence Protocol (PDCP) layer of the second device; and
   performing, by the PDCP layer, further ordering of the plurality of data units based on a sequence number of each data unit of the plurality of data units.

9. The method of claim 8, wherein the second relay node does not comprise a PDCP entity, wherein the second relay node receives the plurality of data units from a first relay node coupled to the second relay node, and wherein the second relay node performs the numbering of the plurality of data units based on a received order of the plurality of data units at the second relay node.

10. The method of claim 9, wherein the sequence number of each data unit is added by the first relay node.

11. The method of claim 10, wherein an adaptation layer of the first relay node comprises a numbering function, or wherein a Radio Link Control (RLC) entity of the first relay node comprises a second ordering function.

12. The method of claim 9, wherein the sequence number of each data unit is added by a first device transmitting the plurality of data units to the first relay node.

13. The method of claim 12, wherein the numbering of the plurality of data units is added by the first relay node.

14. The method of claim 8, wherein a Radio Link Control (RLC) entity of the second relay node comprises an ordering function.

15. A second device comprising:
   a memory configured to store instructions; and
   a processor coupled to the memory, wherein the instructions cause the processor to be configured to:
      receive a plurality of data units from a second relay node, wherein the second relay node transmits the plurality of data units based on a numbering of the plurality of data units;
      perform ordering of the plurality of data units based on the numbering;
      deliver the ordered plurality of data units to a Packet Data Convergence Protocol (PDCP) layer of the second device; and perform, by the PDCP layer, further ordering of the plurality of data units based on a sequence number of each data unit of the plurality of data units.

16. The second device of claim 15, wherein the second relay node does not comprise a PDCP entity, wherein the second relay node receives the plurality of data units from a first relay node coupled to the second relay node, and wherein the second relay node performs the numbering of the plurality of data units based on a received order of the plurality of data units at the second relay node.

17. The second device of claim 16, wherein the sequence number of each data unit is added by the first relay node.

18. The second device of claim 17, wherein an adaptation layer of the first relay node comprises a numbering function, or wherein a Radio Link Control (RLC) entity of the first relay node comprises a second ordering function.

19. The second device of claim 16, wherein the sequence number of each data unit is added by a first device transmitting the plurality of data units to the first relay node.

20. The second device of claim 19, wherein the numbering of the plurality of data units is added by the first relay node.

* * * * *